(12) United States Patent
Kito et al.

(10) Patent No.: US 8,745,344 B2
(45) Date of Patent: Jun. 3, 2014

(54) STORAGE SYSTEM USING THIN PROVISIONING POOL AND SNAPSHOTTING, AND CONTROLLING METHOD OF THE SAME

(75) Inventors: Takahiro Kito, Odawara (JP); Koji Nagata, Kaisei (JP); Kosuke Sakai, Isehara (JP)

(73) Assignee: Hitachi, Ltd., Tokyo (JP)

( * ) Notice: Subject to any disclaimer, the term of this patent is extended or adjusted under 35 U.S.C. 154(b) by 178 days.

(21) Appl. No.: 13/144,877

(22) PCT Filed: Jul. 1, 2011

(86) PCT No.: PCT/JP2011/003776
§ 371 (c)(1),
(2), (4) Date: Jul. 15, 2011

(87) PCT Pub. No.: WO2013/005245
PCT Pub. Date: Jan. 10, 2013

(65) Prior Publication Data
US 2013/0007388 A1    Jan. 3, 2013

(51) Int. Cl.
*G06F 13/00*    (2006.01)
(52) U.S. Cl.
USPC .................................. 711/162; 711/E12.103
(58) Field of Classification Search
None
See application file for complete search history.

(56) References Cited

U.S. PATENT DOCUMENTS

| | | | |
|---|---|---|---|
| 7,536,592 B2 | 5/2009 | Watanabe | |
| 2002/0161980 A1* | 10/2002 | Nishikawa | 711/162 |
| 2004/0260897 A1* | 12/2004 | Sanchez et al. | 711/162 |
| 2007/0150677 A1* | 6/2007 | Homma et al. | 711/162 |
| 2007/0162716 A1* | 7/2007 | Yagisawa et al. | 711/162 |
| 2008/0126734 A1* | 5/2008 | Murase | 711/170 |
| 2008/0126736 A1* | 5/2008 | Heil | 711/171 |
| 2009/0193206 A1* | 7/2009 | Ishii et al. | 711/162 |
| 2009/0216977 A1 | 8/2009 | Watanabe | |
| 2010/0058011 A1* | 3/2010 | Satoyama et al. | 711/162 |
| 2010/0088279 A1* | 4/2010 | Zhang et al. | 707/640 |
| 2010/0299495 A1 | 11/2010 | Frank | |
| 2012/0066633 A1* | 3/2012 | Saito et al. | 715/772 |
| 2012/0191932 A1* | 7/2012 | Satoyama et al. | 711/162 |
| 2012/0271797 A1* | 10/2012 | Patil | 707/639 |
| 2012/0331224 A1* | 12/2012 | Jones et al. | 711/114 |
| 2013/0198469 A1* | 8/2013 | Mizuno | 711/162 |

FOREIGN PATENT DOCUMENTS

| | | |
|---|---|---|
| EP | 1835392 A2 | 9/2007 |
| JP | 2006-163729 A | 6/2006 |

* cited by examiner

*Primary Examiner* — Sean D Rossiter

(74) *Attorney, Agent, or Firm* — Volpe and Koenig, P.C.

(57) ABSTRACT

A storage system comprises a storage device from which a physical storage area is created for storing data processed in an external apparatus, a thin provisioning controller creating a physical storage area pool with a plurality of unit physical storage areas from the physical storage area, and creating a logical volume from the physical storage area pool, and a snapshot controller designating the logical volume as a primary volume, defining a secondary volume which is a partner of the primary volume as a combination of the primary volume and difference data, assigning unused one of the unit physical storage areas to the area into which the difference data is to be stored, and setting a volume pair created with the primary volume and the secondary volume into a synchronizing state and a non-synchronizing state.

10 Claims, 30 Drawing Sheets

DIFFERENCE TABLE 1061

PAIR ASSIGNMENT TABLE 1062

Fig. 16

THIN PROVISIONING MANAGEMENT TABLE 1063

| TP POOL ID | USED HDD | ASSIGNED AREA MANAGEMENT ID | UNASSIGNED AREA MANAGEMENT ID | POOL-OVER THRESHOLD |
|---|---|---|---|---|
| 1 | HD1-HD5 | 1 | 1 | 90% |
| ... | ... | ... | ... | ... |
| ... | ... | ... | ... | ... |

Fig. 17

SNAPSHOT JOB MANAGEMENT TABLE 1064

| PAIR ID | PVOL ID | WRITE DATA LBA | WRITE DATA LENGTH | TEMPORARY CACHE AREA | SAVE AREA LBA | JOB STATUS |
|---|---|---|---|---|---|---|
| 1 | 1 | 0X00 | 128KB | 1 | 0010 | WRITING |
| ... | ... | ... | ... | ... | ... | ... |
| ... | ... | ... | ... | ... | ... | ... |

Fig. 18A

SEGMENT MANAGEMENT TABLE (WRITE SIDE) 1065A

| SEGMENT POSITION ID 10651A | DESTAGING DISABLE BIT 10652A | READING BIT 10653A |
|---|---|---|
| 1 | ON | ON |
| ... | ... | ... |
| ... | ... | ... |

Fig. 18B

SEGMENT MANAGEMENT TABLE (READ SIDE) 1065B

| SEGMENT POSITION ID 10651B | DESTAGING DISABLE BIT 10652B | READING BIT 10653B |
|---|---|---|
| 1 | OFF | OFF |
| ... | ... | ... |
| ... | ... | ... |

Fig. 19

SNAPSHOT INFORMATION TABLE 1066

| LU ID | PAIR STATUS | PAIR ATTRIBUTE | PARTNER LUN | VVOL ID | SECONDARY LU QUANTITY | RESTORATION VVOL | PVOL ERROR FLAG | AVAILABLE POOL ID | PORT ID | TARGET ID |
|---|---|---|---|---|---|---|---|---|---|---|
| 1 | PAIR | P | 2 | VVOL 1 | 1 | VVOL 1 | OFF | 1 | 1 | 1 |
| ⋮ | ⋮ | ⋮ | ⋮ | ⋮ | ⋮ | ⋮ | ⋮ | ⋮ | ⋮ | ⋮ |
| ⋮ | ⋮ | ⋮ | ⋮ | ⋮ | ⋮ | ⋮ | ⋮ | ⋮ | ⋮ | ⋮ |

| | 10671 | 10672 | 10673 | 10674 | 10675 | 10676 | 10677 | 10678 |
|---|---|---|---|---|---|---|---|---|
| | PAIR ID | SVOL PAIR STATUS | LU ID | PARTNER LUN | MIRROR NUMBER | COPY RATE | GROUP DESIGNATION | GROUP ID |
| 1067A | 1 | PSUS | PVOL1 | VVOL1 | 0 | NORMAL | NO | CTG1 |
| 1067B | ... | ... | ... | ... | ... | ... | ... | ... |
| | ... | ... | ... | ... | ... | ... | ... | ... |

| | SVOL WRITE RECEIPT FLAG | SVOL R/W DISABLE FLAG | SS SPLIT TIME | SPLIT MODE | VVOL CAPACITY PREDETERMINATION MODE | SCHEDULING INFORMATION | AUTOMATIC DELETION FLAG | PAIR NAME |
|---|---|---|---|---|---|---|---|---|
| 1067C | OFF | OFF | 11.05.10. 12:00:00 | ON | ON | ON (DAYLY) | OFF | GEN01 |
| 1067D | ... | ... | ... | ... | ... | ... | ... | ... |
| 10679 | ... | ... | ... | ... | ... | ... | ... | ... |

CONSISTENCY GROUP INFORMATION MANAGEMENT TABLE 1068

| CTG INFORMATION | USE STATUS | COPY TYPE | GROUP NAME |
|---|---|---|---|
| CTG01 | USED | SS | BKUP |
| ... | ... | ... | ... |
| ... | ... | ... | ... |

Fig. 22

LU INFORMATION MANAGEMENT TABLE 1069

| LU ID | RELATED RAID GROUP ID | DATA STORAGE AREA INFORMATION | SIZE | MANAGING CONTROLLER ID | HOST CONNECTION INFORMATION | PAIR ID | FORMAT-IN-PROGRESS FLAG |
|---|---|---|---|---|---|---|---|
| 1 | 1 | 50% | 100GB | 1 | CONNECTED | 1 | OFF |
| ... | ... | ... | ... | ... | ... | ... | ... |
| ... | ... | ... | ... | ... | ... | ... | ... |

Fig. 23

VVOL INFORMATION MANAGEMENT TABLE 106A

| VVOL ID | SIZE | MANAGING CONTROLLER ID | HOST CONNECTION INFORMATION | LU ID | PAIR ID |
|---|---|---|---|---|---|
| VVOL1 | 500GB | 1 | CONNECTED | LU02 | 1 |
| ... | ... | ... | ... | ... | ... |
| ... | ... | ... | ... | ... | ... |

106A1 106A2 106A3 106A4 106A5 106A6

STORAGE SYSTEM USING THIN PROVISIONING POOL AND SNAPSHOTTING, AND CONTROLLING METHOD OF THE SAME

TECHNICAL FIELD

The present invention relates to a storage system and a method of controlling the same.

BACKGROUND ART

As the virtualization technique for computer resources improves, a server virtualization which enables a plurality of virtual machines operated on a single physical server to concurrently execute a plurality of tasks is being used widely. Similarly, a capacity virtualization is widely being used, in which when an external apparatus such as a host computer demands a data storing area, unit physical storage areas are provided from a pool consisting of a plurality of the unit physical storage areas, each of which being created by dividing a physical storage area of a storage device. This capacity virtualization is generally known as a "thin provisioning."

The virtual machine of the server virtualization each uses a logical volume (Logical Unit, LU) as a dedicated logical storage area for a data storage area. Such a configuration is usually employed that, where a snapshot pair is created with two LUs, a primary volume (PVOL) and a secondary volume (SVOL), the SVOL is assigned to the LU for the virtual machine. In this configuration, not an ordinary LU but a virtual volume (VVOL) is usually used for the SVOL. The VVOL is constructed from data stored in a PVOL and difference data from the data in the PVOL. When the VVOL is used for a data storage area of the virtual machine, the LU is not necessarily provided to each virtual machine and the storage device is efficiently utilized. The difference data is stored in an LU dedicated for storing only the difference data. A snapshot pair of the PVOL and the VVOL is created for each virtual machine and the snapshot pair is subject to a split status, then the VVOL can be used for a data storage area of the virtual machine to which the above VVOL is assigned. Using the function of the snapshot pair, data processing such as backup and restoration of data can be timely carried out.

In order to apply the snapshot function effectively, the technique disclosed, for example, in PTL 1 is proposed. PTL 1 discloses, for example, a storage system having a physical snapshot executing part writing updated data into both a primary storage device and a secondary storage device, a logical snapshot executing part writing input data into the primary storage device and difference data of difference between the input data and data prior to update into the secondary storage device, an update data determination part that, when creation of snapshot data is requested by an upper apparatus, determines whether or not there exist data to be updated in the primary storage device with respect to the creation request, a data update amount determination part that when the update data determination part detects presence of the updated data in the primary storage device, determines whether or not the data update amount in the primary storage device is larger than a predetermined amount, and a snapshot executing part selector that, when the data update amount determination part determines the data update amount in the primary storage device is larger than the predetermined amount, selectively drives the physical snapshot executing part, and, when the data update amount determination part determines the data update amount in the primary storage device is smaller than the predetermined amount or the data to be updated does not exist in the primary storage device, selectively drives the logical snapshot executing part. PTL 1 describes when creating snapshot data in the storage system, it can be prevented that a data space for saving data prior to update is filled with saved data from the primary (logical) volume and the process of creation of the snapshot data is abnormally aborted.

CITATION LIST

Patent Literature

PTL 1: Japanese Patent Application Laid-open Publication No. 2006-163729

SUMMARY OF INVENTION

Technical Problem

However, in PTL 1, there is not disclosed a configuration in which a thin provisioning technique is applied to the snapshot function which is referred to as a logical snapshot function or a quick shadow function in PTL 1 to enable efficient utilization of storage resources. PTL 1 does not disclose a technique for improvement of an access rate when accessing the VVOL by an external apparatus in the configuration that a VVOL is used for an SVOL of a snapshot pair, either.

The present invention has been made in order to solve the above and other problems, and an object thereof is to provide a storage system with a function of enabling creating a snapshot pair easily while efficiently utilizing storage resources by employing a thin provisioning and a controlling method of the same. Another object of the present invention is to provide a storage system enabling improvement of an access rate in accessing an SVOL in a snapshot pair created with the thin provisioning and a controlling method of the same.

Solution to Problem

One aspect of the present invention for achieving the above and other objects is a storage system comprising a storage device from which a physical storage area is created, the physical storage area being for providing a logical storage area storing data processed in an external apparatus, a thin provisioning controller creating a plurality of unit physical storage areas from the physical storage area of the storage device, creating a physical storage area pool as a set of the unit physical storage areas, and creating a logical volume as a unit logical storage area having a part of the unit physical storage areas included in the physical storage area pool, and a snapshot controller designating the logical volume as a primary volume, defining a secondary volume which is a partner of data copy including a data backup for the primary volume as a combined data of the data stored in the primary volume and difference data which is data different from the stored data in the primary volume, assigning unused one of the unit physical storage areas in the physical storage area pool as an area into which the difference data is to be stored, and setting a volume pair created with the primary volume and the secondary volume into a synchronizing state where the data stored in the primary volume and the data stored in the secondary volume are synchronized and a non-synchronizing state where the data stored in the primary volume and the data stored in the secondary volume are not synchronized.

Another aspect of the present invention is the above-mentioned storage system further comprising a primary volume data temporary storing area being a storage area for storing data read from the primary volume temporarily, and a pool data temporary storing area being a storage area for storing data to be written into the physical storage area pool, the storage system, when receiving a data write request for the secondary volume from the external apparatus, determining whether or not the data to be written in the data write request includes corresponding difference data, if it is determined that the data to be written in the data write request does not include corresponding difference data, when the data to be written is stored into the pool data temporary storing area, transmitting to the external apparatus information indicating that processing of the data write request is completed, reading primary volume data stored in a storage area including the data to be written from the primary volume and storing the primary volume data as read into the primary volume data temporary storing area, combining the primary volume data as read with the data to be written in the pool data temporary storing area, and storing the data as combined into the physical storage area pool.

Advantageous Effects of Invention

According to one aspect of the present invention, a storage system with a function of enabling creating a snapshot pair easily while efficiently utilizing storage resources by employing a thin provisioning and a controlling method of the same are provided. According to another aspect of the present invention, a storage system enabling improvement of an access rate in accessing an SVOL in a snapshot pair created with the thin provisioning and a controlling method of the same are provided.

BRIEF DESCRIPTION OF DRAWINGS

FIG. 16 is a figure showing an example of a thin provisioning management table 1063.

FIG. 17 is a figure showing an example of a snapshot job management table 1064.

FIG. 18A is a figure showing an example of a segment management table (Write side) 1065A.

FIG. 18B is a figure showing an example of a segment management table (Read side) 1065B.

FIG. 19 is a figure showing an example of a snapshot information table 1066.

FIG. 20 is a figure showing an example of a snapshot pair specific information table 1067.

FIG. 21 is a figure showing an example of a consistency group information management table 1068.

FIG. 22 is a figure showing an example of an LU information management table 1069.

FIG. 23 is a figure showing an example of a VVOL information management table 106A.

DESCRIPTION OF EMBODIMENTS

The embodiments for carrying out the present invention will be described hereinbelow, as referring to the appended drawings. It is to be noted that the functions of various programs to be mentioned below are realized by a CPU or a processor which reads the programs from memory and executes the same as referring to information stored in various management tables.

Figure 1:
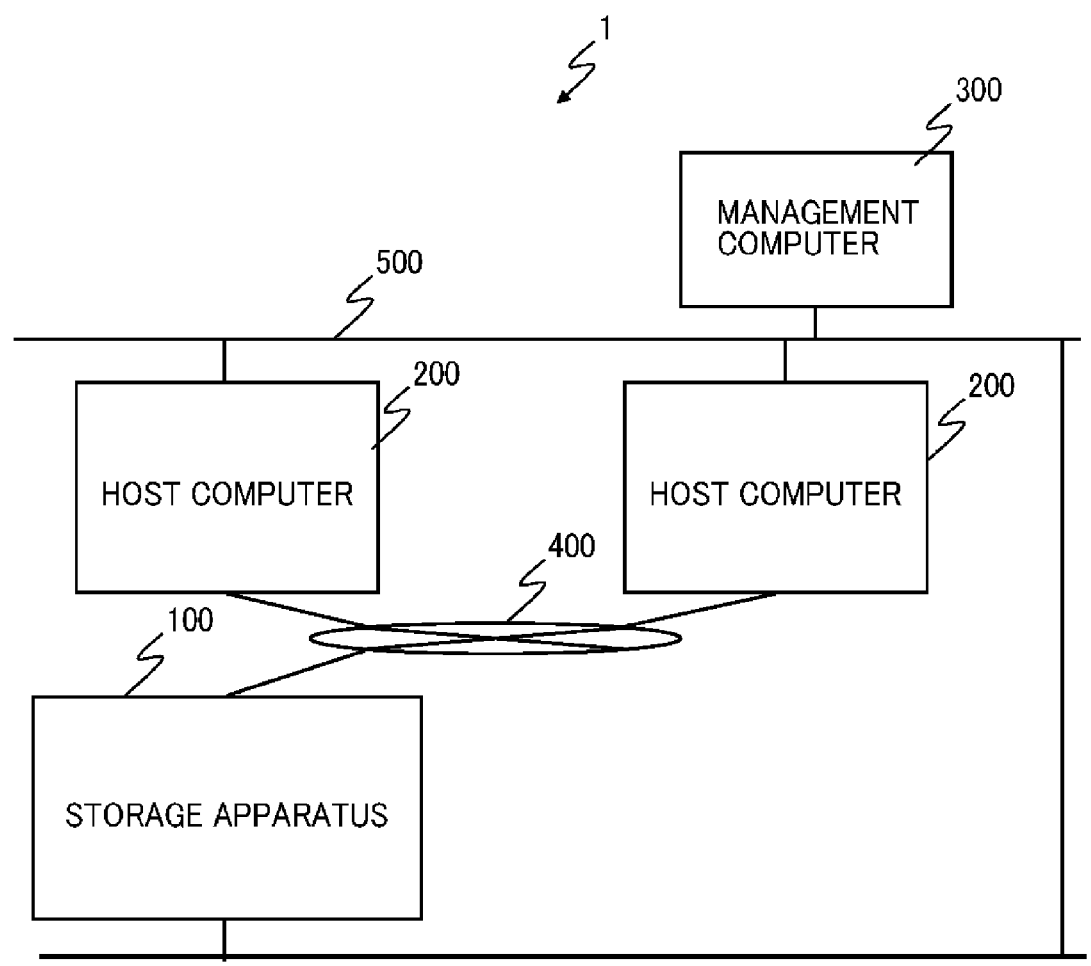
FIG. 1 is a figure showing a connection construction of a storage system 1 according to one embodiment of the present invention.

Firstly, a construction of a storage system 1 according to an embodiment of the present invention will be described. FIG. 1 shows an example of a connection configuration of the storage system 1. The storage system 1 includes a storage apparatus 100, at least one host computer, hereinafter "host," 200, and a management computer 300.

The host 200 and the storage apparatus 100 providing a data storage area for the data processed by the host 200 are coupled with a first communication network 400 communicatively to each other. The first communication network 400 is, for example, a SAN (Storage Area Network) constructed using a Fibre Channel protocol (FC protocol). The first communication network 400 provides a data path for a data IO between the host 200 and the storage apparatus 100 as well as a data IO between the storage apparatuses 300.

The management computer 300, the host 200 and the storage apparatus 100 are coupled with a second communication network 500 communicatively to each other. The second communication network 500 is constructed as, for example, a LAN (Local Area Network). The second communication network 500 provides a data path for collecting configuration information and/or performance information from the host 200 and the storage apparatus 100 by the management computer 300 and transmitting of management information to the host 200 and the storage apparatus 100 from the management computer 300 using a communication protocol considered appropriate.

It is to be noted that FIG. 1 as an example illustrates the storage system 1 including the two hosts 200, however, a single host 200, or three or more hosts 200 may be coupled in the storage system 1.

Figure 2:
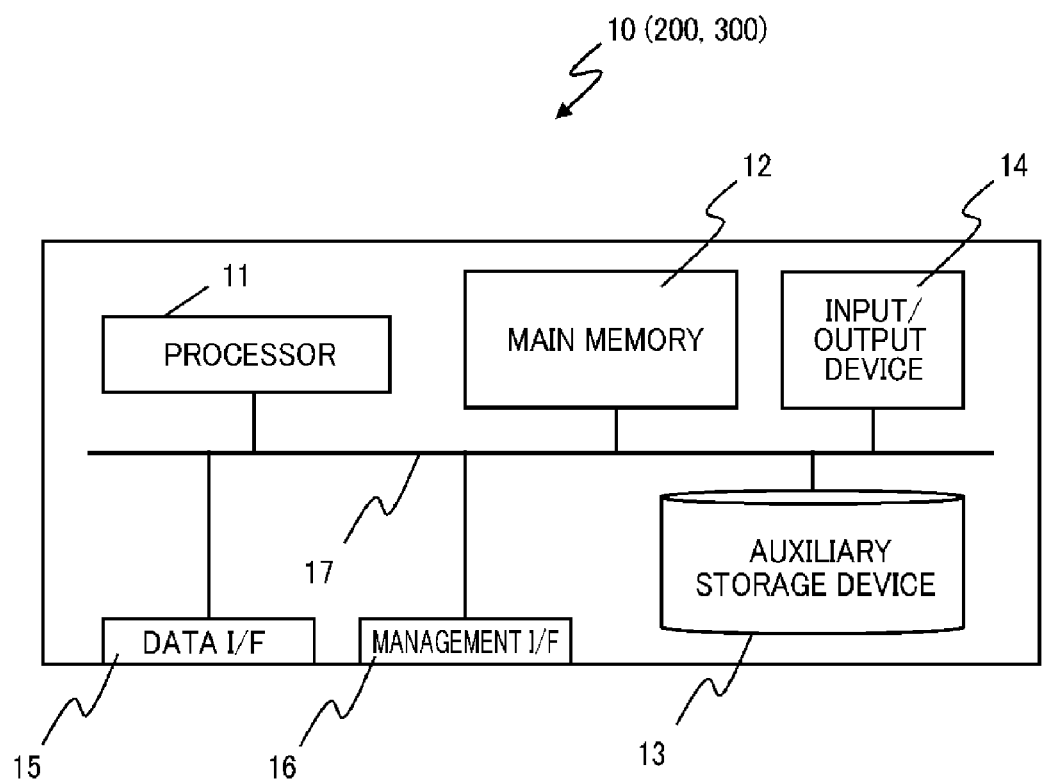
FIG. 2 is a figure showing an example of a construction of a computer 10.

Then, a hardware configuration of the host 200 and the management computer 300 will be described. FIG. 2 shows an exemplary construction of a computer 10 which can be used as the host 200 or the management computer 100. The computer 10 includes a processor 11 such as a CPU (Central Processing Unit), MPU (Micro Processing Unit), or the like, a main memory 12, an auxiliary storage apparatus 13, an input/output device 14, a data interface (data I/F) 15, a management interface (management I/F) 16, and an internal communication network 17 which communicatively couples the processor 11 to the management I/F 16 to each other.

The main memory 12 is constructed with a volatile memory device including semiconductor memory such as a RAM (Random Access Memory) and a ROM (Read Only Memory), for example. The auxiliary storage device 13 may be constructed with a writable/readable non-volatile storage device such as a hard disk drive (HDD), an SSD (Solid State Drive) or a read-only non-volatile storage device such as magneto optical media, and the like.

The input/output device 14 may be constructed with an output device including a display device such as a CRT display and an LCD display, and an input device such as a keyboard, a mouse, and/or a tablet. The data I/F 15 and the management I/F 16 are communication interface units respectively coupled with the first communication network 400 and the second communication network 500. Examples of the data I/F 15 and the management I/F 16 are an HBA (Host Bus Adapter) and a NIC (Network Interface Card), respectively. It is to be noted the data I/F 15 may be omitted when the computer 10 is used as the management computer 300. It is also to be noted a service interface as a communication interface unit equivalent to the management I/F 16 may be provided for communicating with another host 200 when the computer 10 is used as the host 200.

Figure 3:
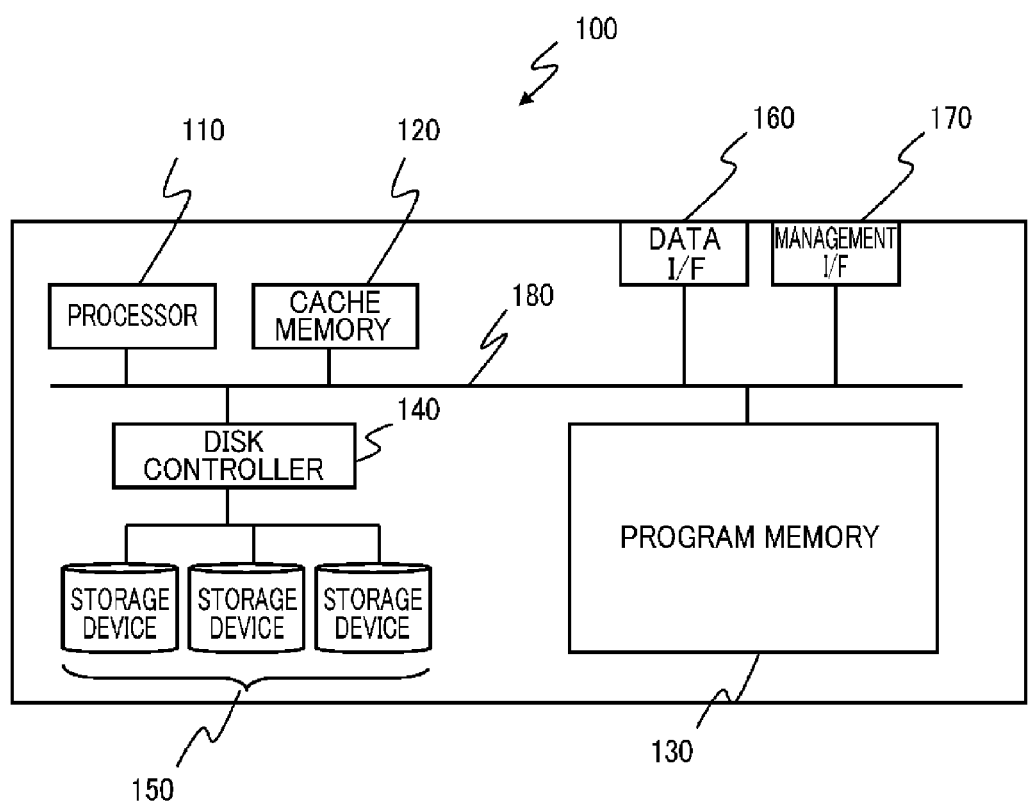
FIG. 3 is a figure showing an example of a construction of a storage apparatus 100.

Then, a hardware configuration of the storage apparatus 100 will be described. FIG. 3 shows an exemplary hardware construction of the storage apparatus 100. The storage apparatus 100 includes a processor 110 such as a CPU or an MPU, a cache memory 120, a program memory 130, a disk controller 140, a storage device 150, a data I/F 160, a management I/F 170, and an internal communication network 180 communicatively coupling the processor 110 to the management I/F 170 to each other.

The cache memory 120 provides a storage area for temporarily storing data to be written into the storage device 150 from the external apparatus such as the host 200 and data read from the storage device 150. The cache memory 120 is constructed with a semiconductor memory device such as a RAM. The program memory 130 includes a storage area for storing programs for implementing the functions of the storage apparatus 100 of the present embodiment and various data to be used by the programs. The program memory 130 is constructed with a semiconductor memory device such as a RAM. The cache memory 120 is provided with a temporary storing area for temporarily storing IO data to/from a snapshot pair as will be described later.

The disk controller 140 is a control unit for processing data IO received from an external device such as the host 200. The disk controller 140 controls data writing and data reading between the cache memory 120 and the storage device 150, for example. The storage device 150 can be constructed with a readable/writable non-volatile storage device such as an HDD, an SSD, or a magnetic tape apparatus. The storage device 150 provides a physical storage area defining a data storage area storing data from the host 200. As will be described later, a virtual volume (VVOL) which is a logical storage area virtualized by a RAID control and a virtualization control, is provided to the external apparatus.

The data I/F 160 and the management I/F 170 are communication interface units respectively coupled with the first communication network 400 and the second communication network 500, as the data I/F 15 and the management I/F 16 in the computer 10. It is to be noted, though not illustrated in the construction in FIG. 3, the storage apparatus 100 may be provided with a component corresponding to the input/output device 14 of the computer 10.

Figure 4:
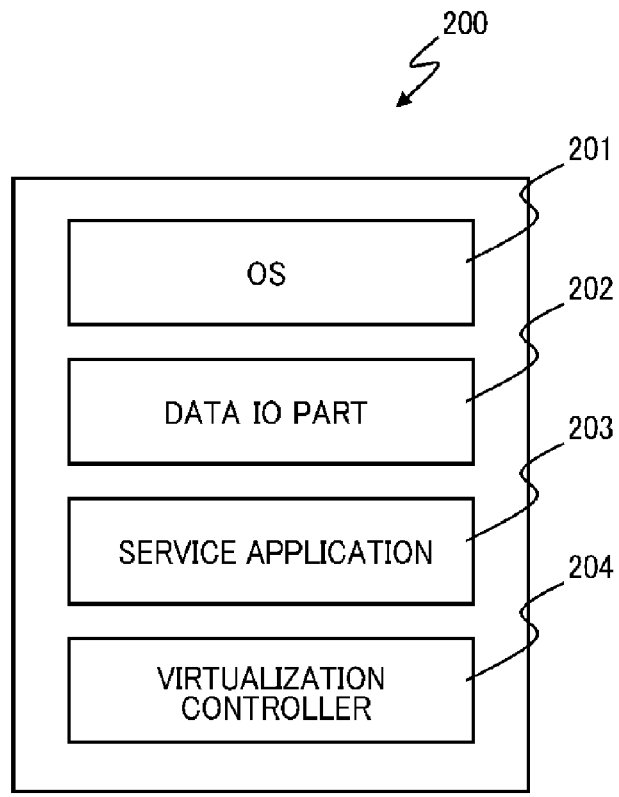
FIG. 4 is a figure showing an example of a software construction of a host computer 200.
Figure 5:
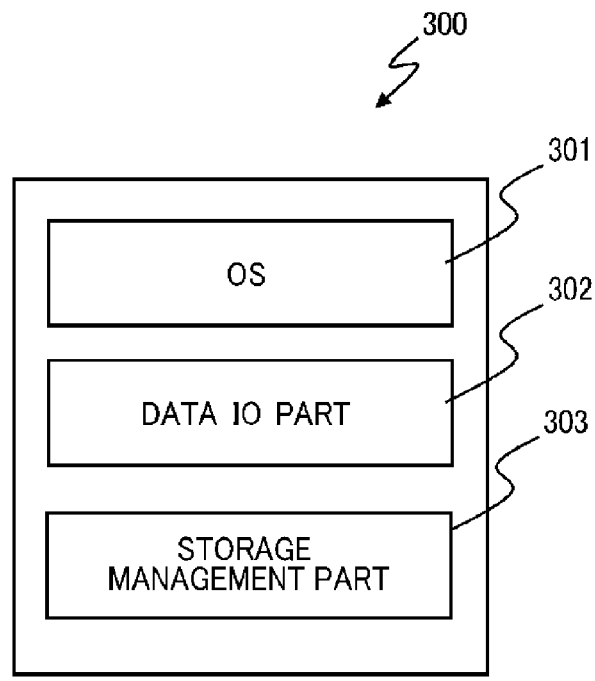
FIG. 5 is a figure showing an example of a software construction of a storage apparatus 100.
Figure 6:
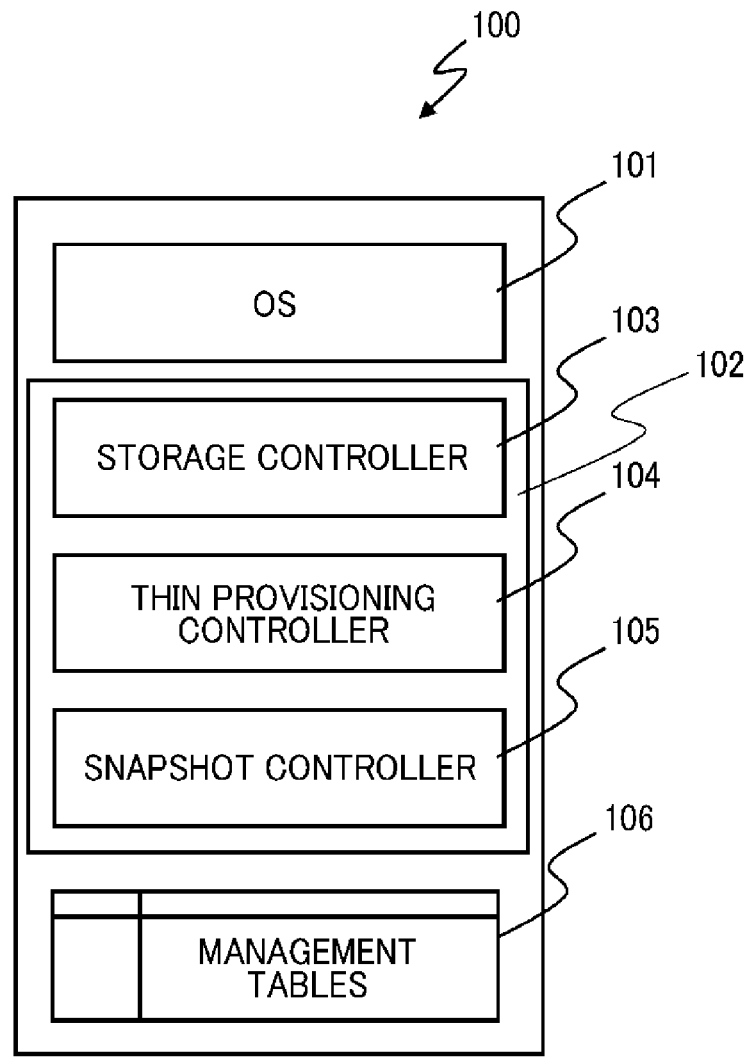
FIG. 6 is a figure showing an example of construction of management tables 106.

Then, respective software configurations of the host 200, the management computer 300, and the storage apparatus 100 will be described. FIGS. 4-6 show the software configurations of the host 200, the management computer 300, and the storage apparatus 100 of the present embodiment respectively.

First, the host 200 will be described. The host 200 has the respective operational parts including an OS 201, a data IO part 202, a service application 203, and a virtualization control part 204. The OS 201, the data IO part 202, the service application 203, and the virtualization control part 204 are stored in the auxiliary storage device 13 of the computer 10, for example, and are read out into the main memory 12 and executed by the processor 11.

The OS 201 is software implementing a fundamental function of the computer 10 as the host 200 such as a data input/output processing and a memory management processing. Any OS which is suitable may be selected and used as the OS 201 from among those used for a general computer 10. The data IO part 202 carries out a data input/output processing through the input/output device 14, the data I/F 15, and the management I/F 16 under control by the OS 201.

The service application 203 operating on the OS 201 in the host 200, is an application program carrying out a data processing regarding the services provided by the host 200. The service application 203 uses the LU provided by the storage apparatus 100 as the data storage area.

The virtualization control part 204 is a program for server virtualization operating on the OS 201 and implements a function of creating one or more virtual servers and allows them to operate on the host 200 as a physical server. The server virtualization program may be selected and used from among the existing similar programs, which is considered appropriate. Optionally, the virtualization control part 204 may be omitted from the host 200.

Then, a description of the management computer 300 will be given. The management computer 300 has functional parts including an operating system (OS) 301, a data IO part 302, and a storage management part 303. The OS 301, the data IO part 302, and the storage management part 303 are stored in the auxiliary storage device 13 of the computer 10 and are read out into the main memory 12 and executed by the processor 11.

The OS 301 and the data IO part 302 are similar to the OS 201 and the data IO part 202 of the host 200.

The storage management part 303 receives general operational instructions on management through the input/output device 14 and transmits the instructions to the storage apparatus 100. The storage management part 303 also has a function of monitoring an operation of the storage apparatus 100 with an SNMP (Small Network Monitoring Protocol), for example. It is to be noted that the construction of the management computer 300 may be provided in the storage apparatus 100.

Next, the storage apparatus 100 will be described. The storage apparatus 100 is provided with respective functional parts including an OS 101, and a disk controller 102 including a storage controller 103, a thin provisioning controller 104, and a snapshot controller 105. A set of management tables 106 is also stored in the storage apparatus 100, the tables recording various data to be used by the above functional parts. The OS 101, the storage controller 103, the thin provisioning controller 104, and the snapshot controller 105 are stored in the program memory 130, for example, and are read out and executed by the processor 110. The OS 101 is the same as the OS 301 of the management computer 300, for example.

The storage controller 103 has a function of managing a physical storage area provided by the storage device 150 as one or more RAID groups created according to an appropriate RAID level and of creating a logical volume (LU) as one or more logical storage areas based on the RAID groups. Further, the storage controller 103 carries out processing of a data write/read request from the server 200, and various operation commands from the management computer 300. The function of writing data into an SVOL (VVOL) of a snapshot pair of the present embodiment as will be described later is implemented as a function of the storage controller 103.

The thin provisioning controller 104 creates a unit physical storage area or a page, for example, from the physical storage area belonging to the RAID group created by the storage controller 103 from the storage device 150 of the storage apparatus 100. The thin provisioning controller 104 has a function of capacity virtualization of creating a logical storage area by assigning a unit physical storage area such as a page to the data as necessary. It is to be noted that in a plurality of RAID groups, some RAID groups can be operated under thin provisioning and an ordinary LU may be created from the other RAID groups.

The snapshot controller 105 has a function of creating a PVOL and an SVOL from an LU created by the storage controller 103 or a thin provisioning pool, hereinafter "pool," as a set of a number of unit physical storage areas, by the thin provisioning controller 104, and of creating a snapshot pair by coupling the PVOL and the SVOL and operating the pair. The functions of the thin provisioning controller 104 and the snapshot controller 105 will be described later more specifically. It is to be noted that, in the following description, the SVOL creating a snapshot is configured as a VVOL and the SVOL and the VVOL are substantially of the same configuration.

Figure 7:
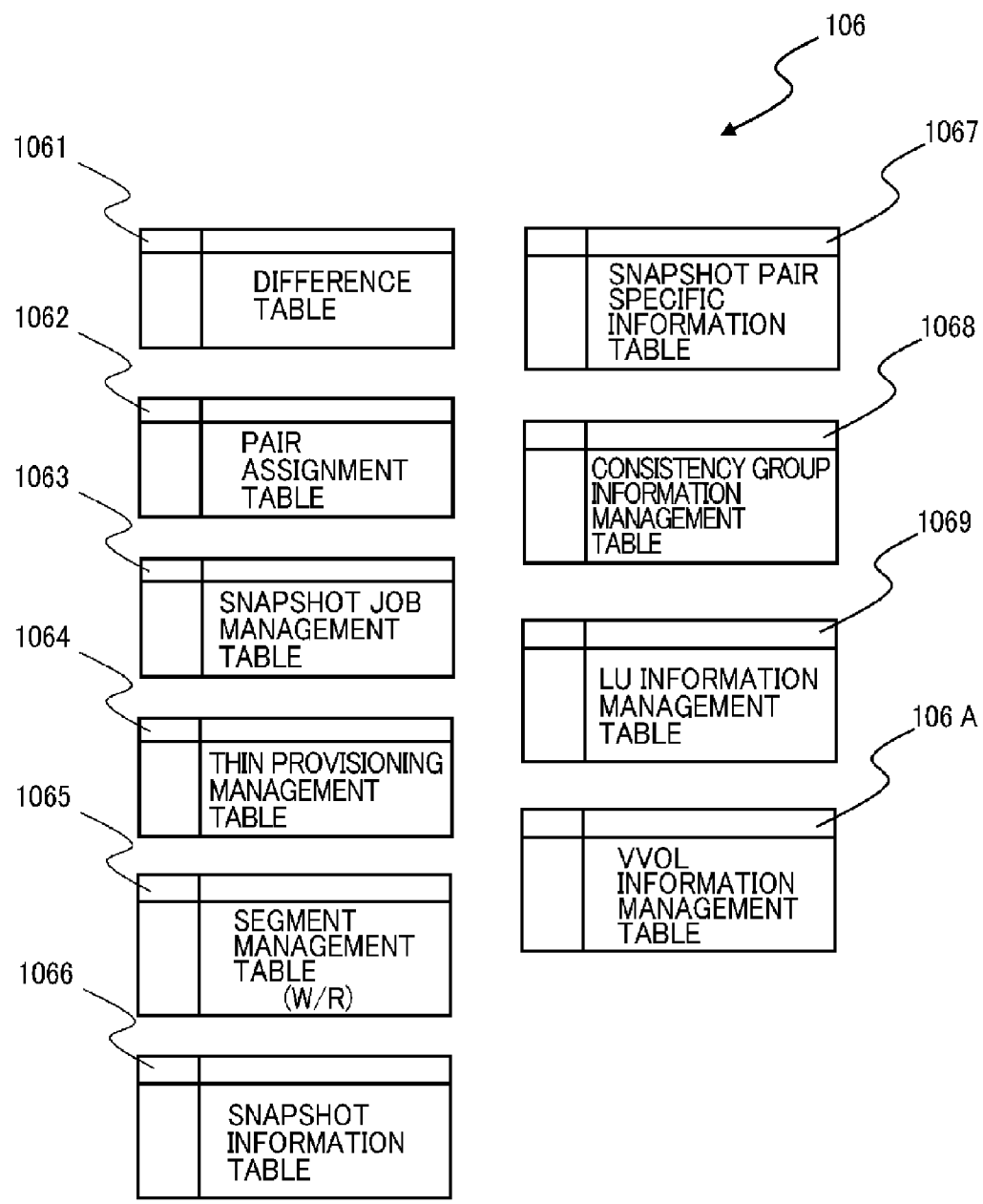
FIG. 7 is a figure showing an example of a software construction of a management computer 300.

Next, the management tables 106 held in the storage apparatus 100 will be described. As shown in FIG. 7, a difference table 1061, a pair assignment table 1062, a thin provisioning management table 1063, a snapshot job management table 1064, a segment management table 1065, a snapshot information table 1066, a snapshot pair specific information table 1067, a consistency group information management table 1068, an LU information management table 1069, and a VVOL information management table 106A are stored, for example, in the program memory 130 of the storage apparatus 100. A specific configuration example of each table will be described later.

Figure 8:
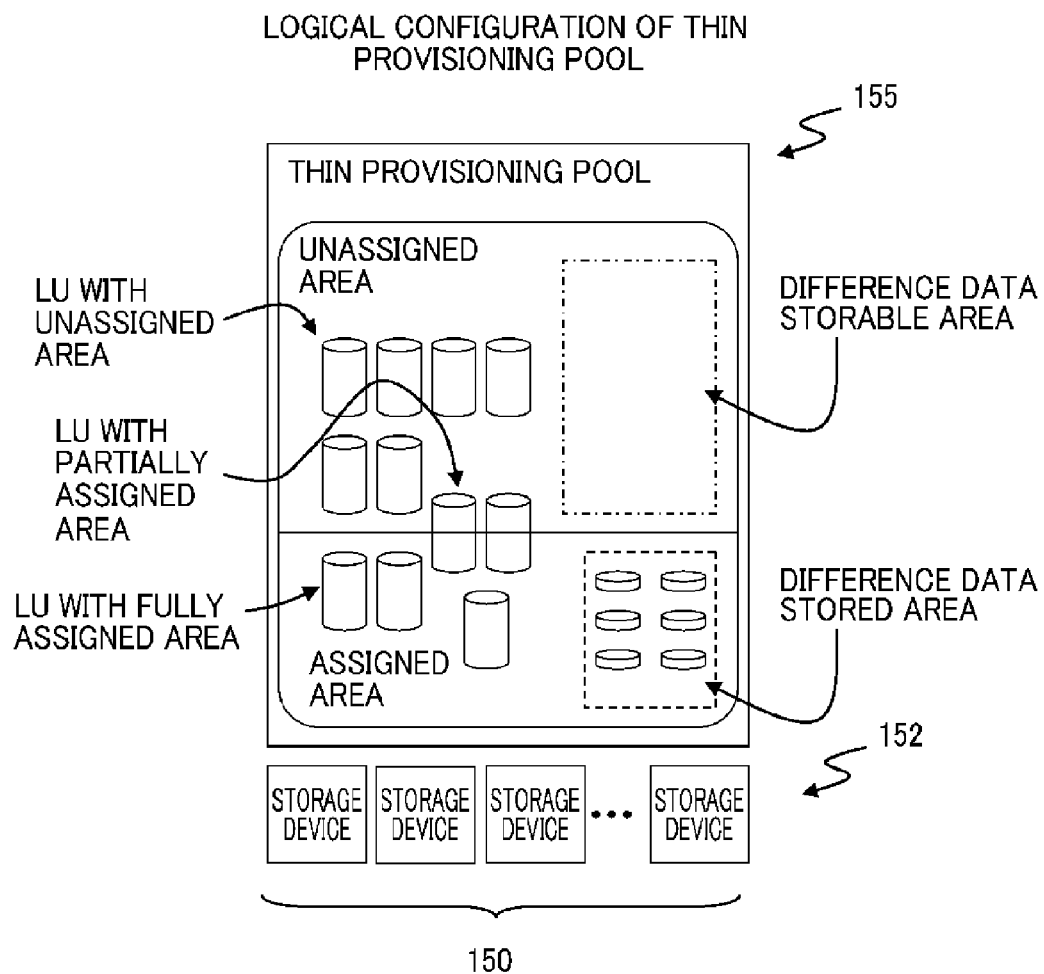
FIG. 8 is a schematic diagram showing a logical configuration of a thin provisioning pool.

Next, referring to FIG. 8, a logical configuration of a pool created by the thin provisioning controller 104 of the storage apparatus 100 will be described. FIG. 8 is a schematic diagram showing a logical configuration of a thin provisioning pool. In the example in FIG. 8, the RAID groups 152 are created from a plurality of the storage devices 150. The thin provisioning controller 104 creates a number of unit physical storage areas from the physical storage area included in the RAID group and allots the unit physical storage areas to data regarding a data write request by the host 200. The thin provisioning controller 104 has the host 200 recognize a logical volume (LU) with a certain logical storage capacity as a data storage area. As shown in FIG. 8, as far as data is not written by the host 200, each LU recognized by the host 200 does not have actual physical storage area. This indicates a state wherein no unit physical storage area is assigned to any of the storage area of the LU.

When the host 200 requests writing data into each LU, the thin provisioning controller 104 allots the unit physical storage areas to the LU into which the data is to be stored. This indicates a state wherein the unit physical storage areas are assigned to a part of the storage are of the LU. When the unit physical storage areas are assigned to the physical storage area corresponding to the entire storage capacity set to the LU, data cannot be written into the LU. As described above, the LU recognized by the host 200 in the storage system 1 of the present embodiment is a virtual LU created by the thin provisioning controller 104.

A PVOL as a primary logical volume of a snapshot pair created by the snapshot controller 105 of the present embodiment is configured as the virtual LU. On the other hand, an SVOL as a partner of the PVOL has a nominal storage area created by combination of the corresponding PVOL and difference data from the data stored in the PVOL, the difference data being stored in the thin provisioning pool 155 by the snapshot controller 105.

Figure 9:
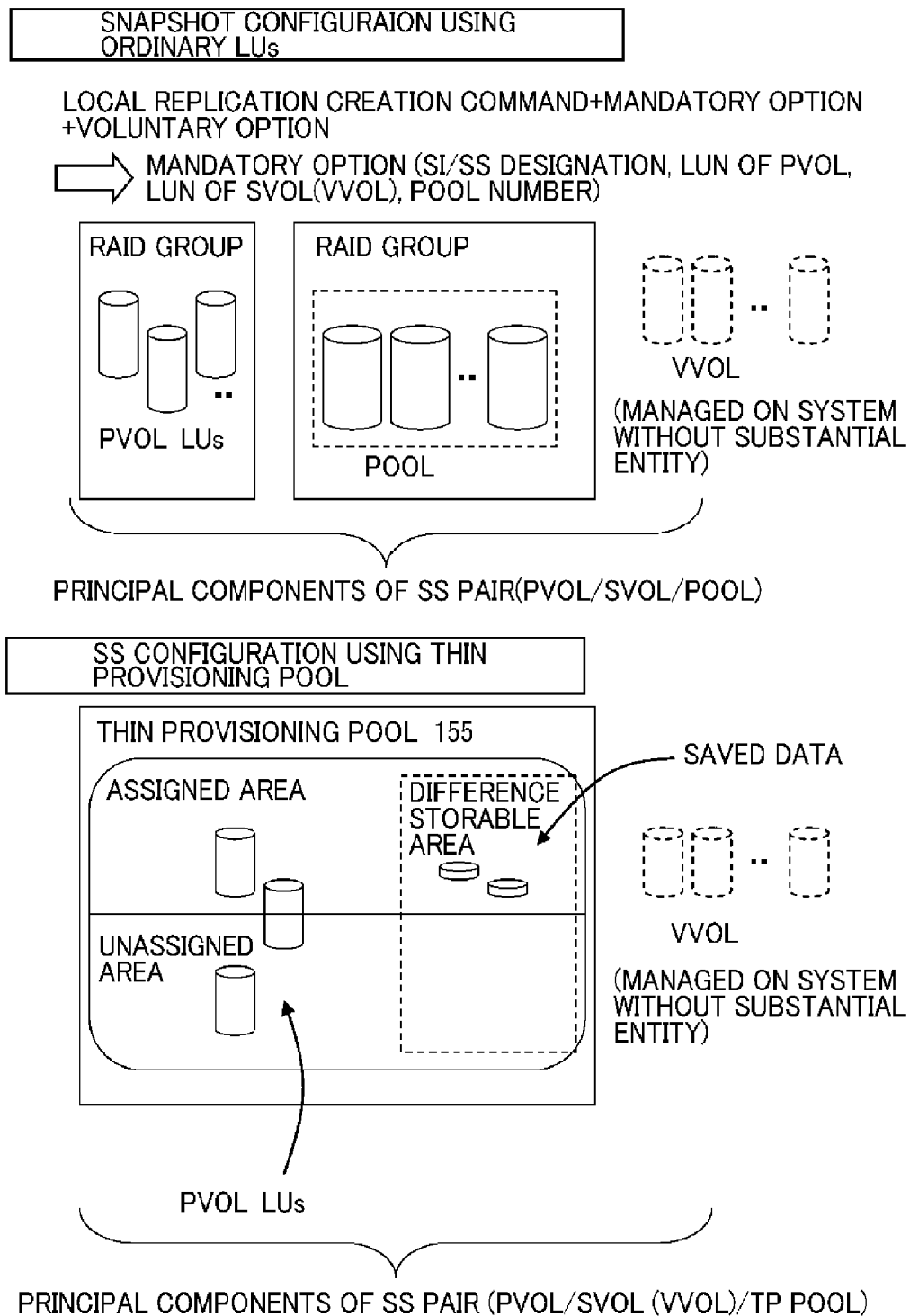
FIG. 9 is a schematic diagram showing a configuration of a snapshot pair.

FIG. 9 schematically shows a comparison between the case where a snapshot pair is created with existing ordinary LUs as a logical volume having a logical storage area to which a physical storage area is mapped in advance and the case where a snapshot pair is created with the thin provisioning pool 155.

When a snapshot pair is created with ordinary LUs, a PVOL is configured as an ordinary LU belonging to a specific RAID group. In contrast, a VVOL as an SVOL in a snapshot pair is obtained from combination of the data stored in the PVOL and the difference data as described referring to FIG. 8. However, in this configuration, there is a difference that the logical storage area to which the difference data is to be stored is in the ordinary LU belonging to the specific RAID group like the PVOL. Thus, an administrator of a storage system must predict a storage capacity to be required in advance and construct a pool including a plurality of LUs to which the difference data is to be stored before assigning a snapshot pair to the host 200 and starting operation. Further, the administrator must identify in advance the LU to be used as the PVOL, the LU to which the difference data for the SVOL are to be stored, and the pool from which the LU used for storing the difference data is created. It is to be noted that the construction simply referred to as a "pool" means a set of LUs for the difference data.

Here, in the construction in FIG. 9, when a snapshot function is set up using ordinary LUs, a shadow image function can be selected. As described in PTL 1 mentioned above, in the shadow image function, updating of the data stored in the PVOL is reflected to the SVOL on a real-time basis. This demands preceding preparation of an LU as the SVOL in the pool. When the shadow image function is realized using the thin provisioning pool, construction of such a snapshot pair created with two LUs used for the PVOL and the SVOL both created from the thin provisioning pool, hereinafter "TP pool," will suffice.

In the storage system 1 of the present embodiment, the PVOL for creating a snapshot pair is created from the TP pool and the host 200 may be provided with an LU with an appropriate storage capacity. The SVOL is configured as a nominal VVOL as combination of the data stored in the PVOL and the difference data. Therefore, it is sufficient to keep a difference data storage area in the TP pool 155 and there is no need to create an ordinary LU for storing the difference data in advance.

Figure 10:
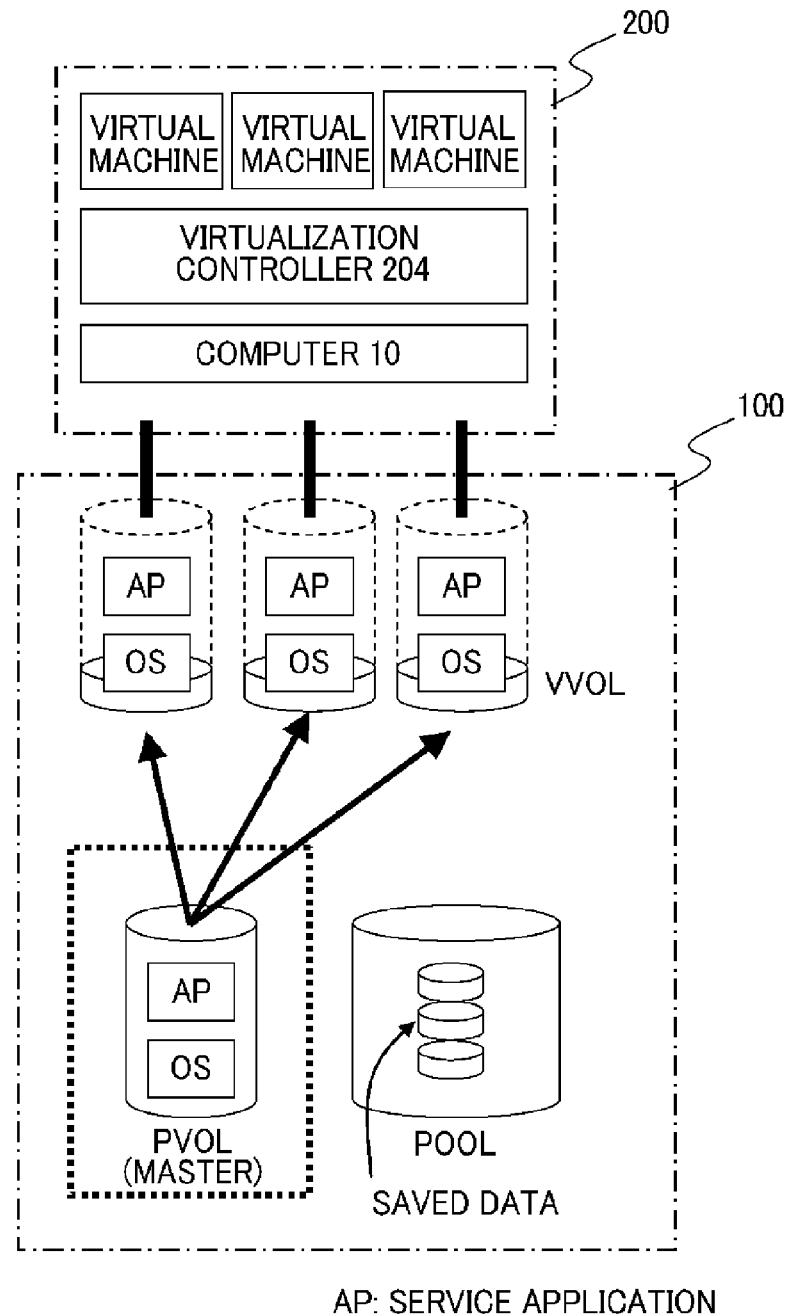
FIG. 10 is a schematic diagram showing a relationship between a snapshot pair and a virtual machine.

FIG. 10 schematically shows a relationship between the virtualization controller 204 and the storage apparatus 100 where three virtual machines are operated on the host 200. The virtualization controller 204 as virtualization software operates on the computer 10 as the host 200 and creates three virtual machines on the host 200.

The storage apparatus 100 provides a VVOL as an LU used as a data storage area for the host 200, actually for each of the virtual machines. Each VVOL functions as an SVOL creating a snapshot pair with a PVOL which is an ordinary LU.

Figure 11:
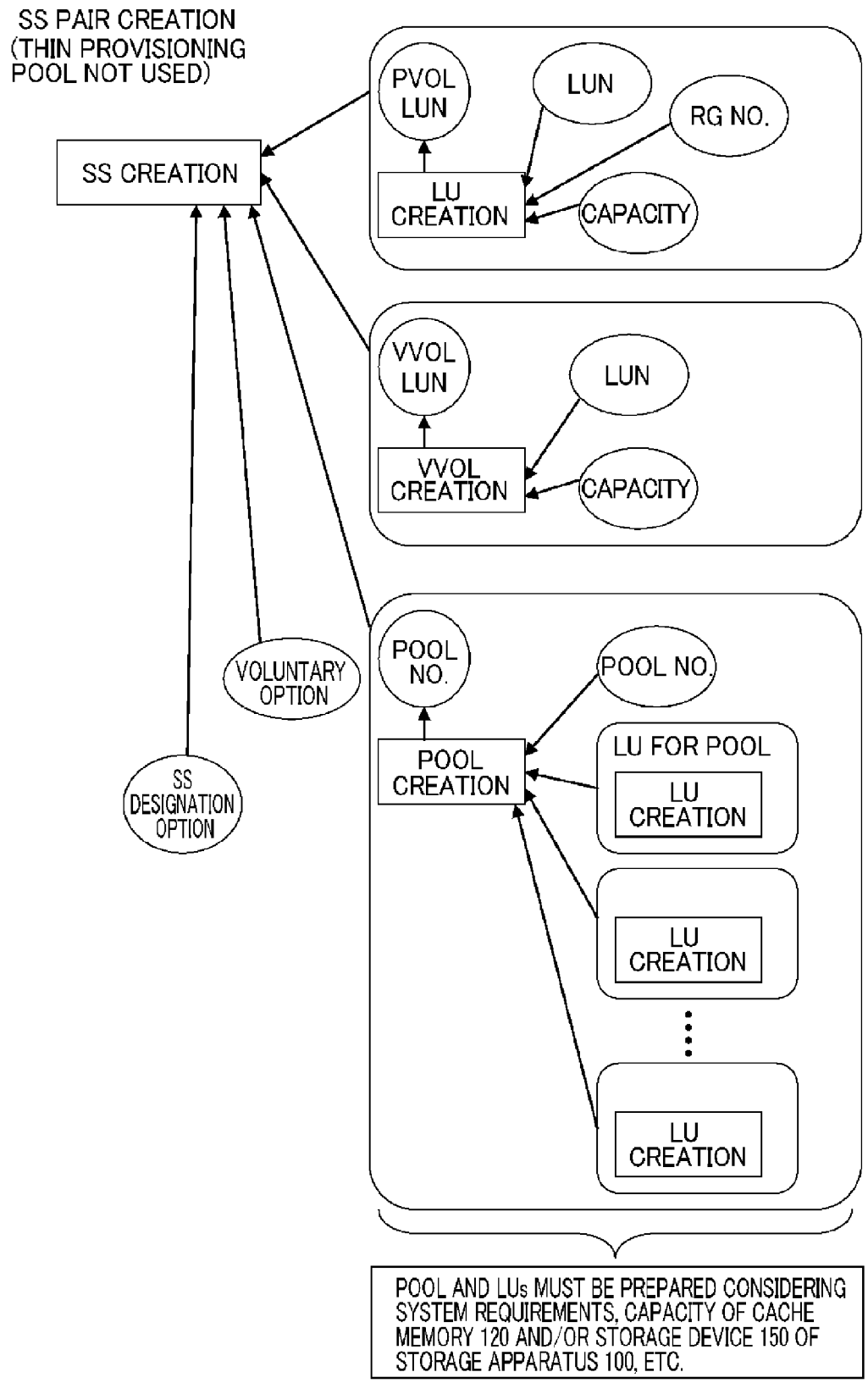
FIG. 11 is a schematic diagram showing an outline of a snapshot pair creation process.

FIG. 11 schematically shows a process of creation of a snapshot pair to be applied to the configuration in FIG. 10. In this configuration, firstly, a PVOL, a VVOL used as an SVOL, and a pool for storing difference data need to be prepared for creating a snapshot pair. The PVOL is created by creating an LU while determining a storage capacity from a RAID group as an origin and appending to the LU an ID or an LU number (LUN) as a predetermined PVOL. The VVOL is created by defining a storage capacity and an LUN as an identification code. Further, the pool for storing the LU as the VVOL is defined as a set of LUs created for VVOLs and created by appending thereto a pool number as an identification code. As mentioned above, in the case where a thin provisioning pool is not used, the process of creating a snapshot pair is very cumbersome.

Figure 12:
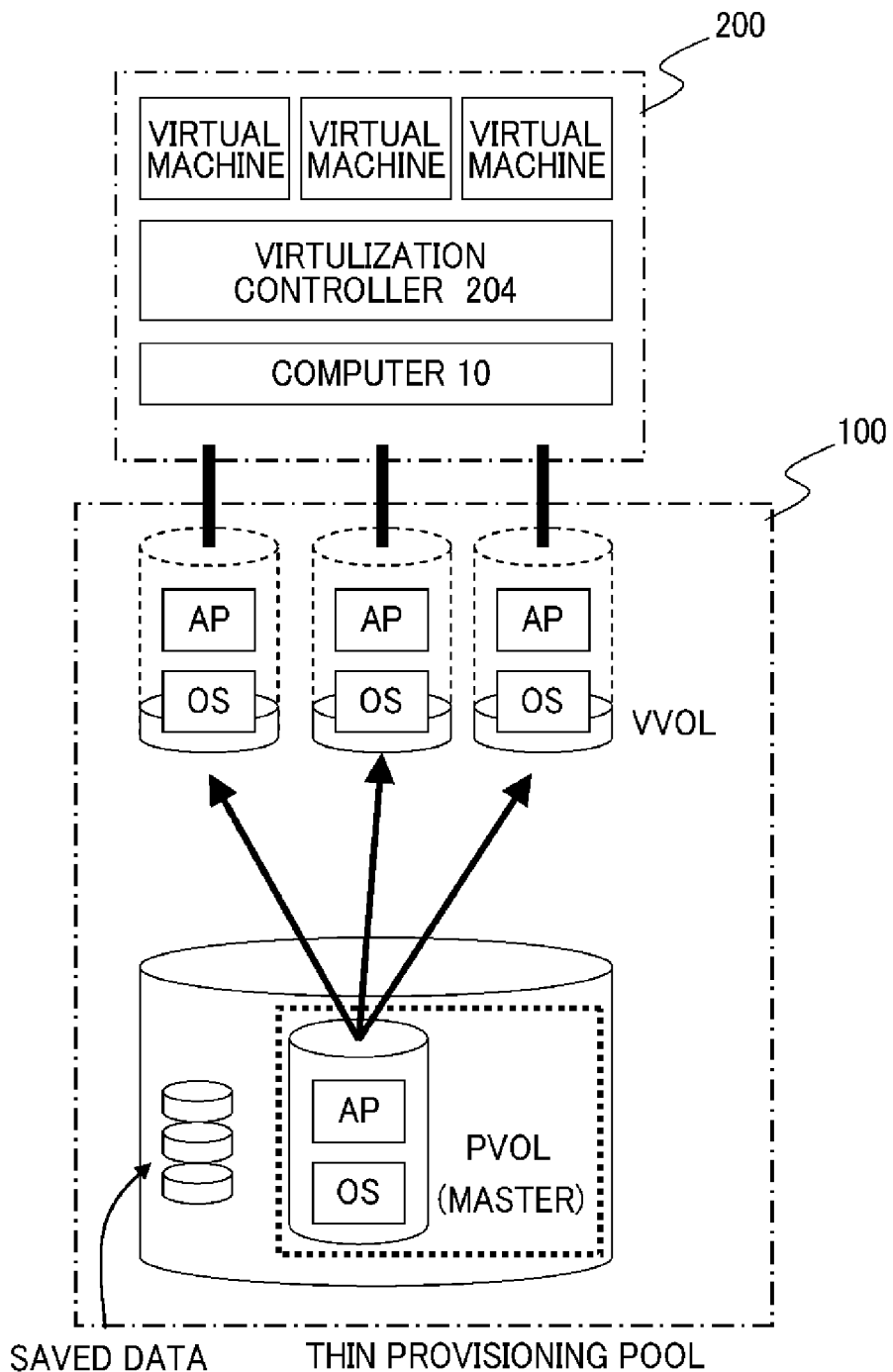
FIG. 12 is a schematic diagram showing a relationship between a snapshot pair and a virtual machine.
Figure 13:
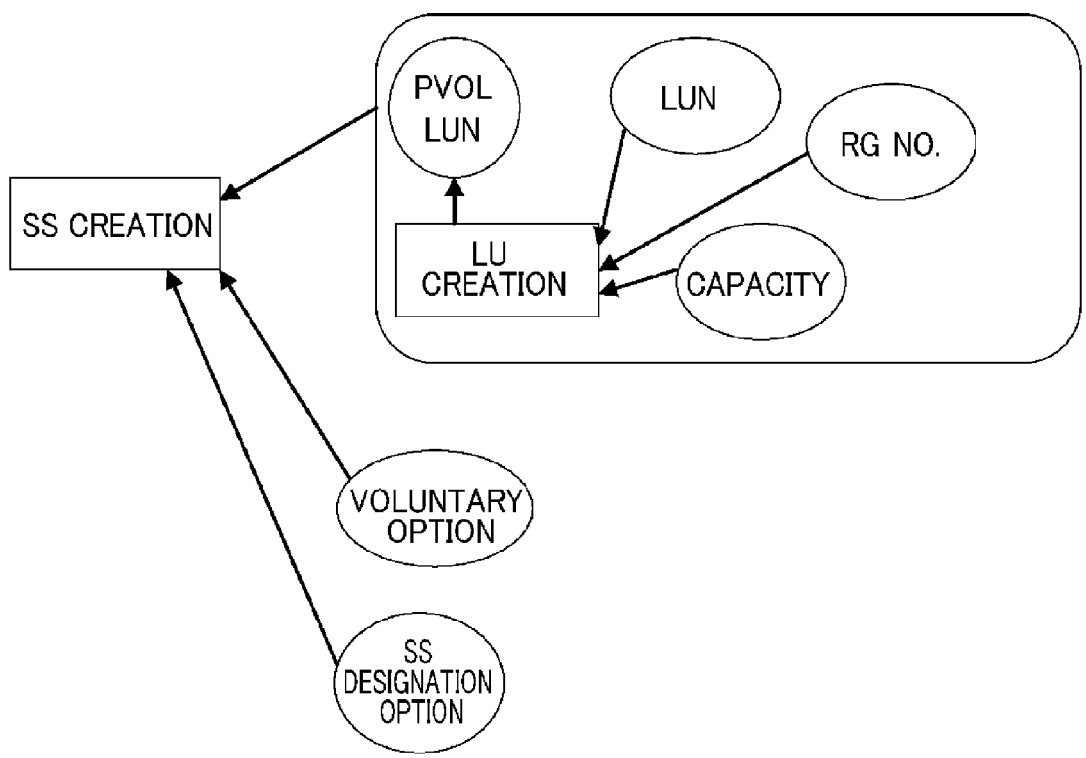
FIG. 13 is a schematic diagram showing an outline of a snapshot pair creation process.

On the other hand, the scheme of carrying out the process of creating a snapshot pair using the thin provisioning pool is shown in FIGS. 12 and 13. As shown in FIG. 12, the three VVOLs create snapshot pairs with the respective PVOLs, each VVOL being defined as the data storage area for each of the three virtual machines operating on the host 200. In the exemplary configuration in FIG. 12 unlike the corresponding configuration in FIG. 10, the PVOL is created from the thin provisioning pool and the difference data for creating the VVOL are also stored in the thin provisioning pool. Therefore, a convenient configuration for an administrator of the storage system 1 is provided such that, as shown in FIG. 13, there is no need to create an LU for the PVOL and an LU for storing the difference data with respective predefined storage capacities in the snapshot pair creating process, and the process of creating a snapshot pair can be started simply with defining the LUNs, the RAID group ID, and a storage capacity of the PVOL. The process of creating a snapshot pair in the present embodiment will be described later referring to an exemplary process flow and the like.

Next, the management tables 106 used for storage control by the storage system 1 of the present embodiment will be described. As described referring to FIGS. 6 and 7, the management tables 106 are stored in the program memory 130 of the storage apparatus 100, for example.

Figure 14:
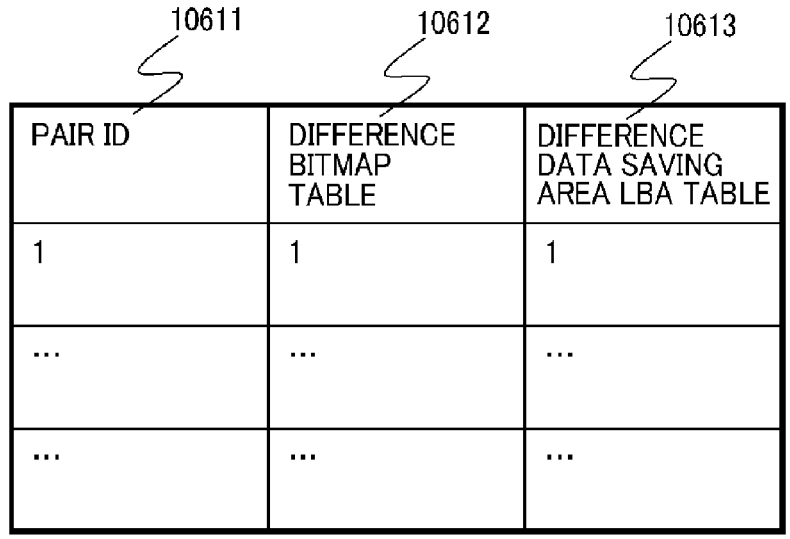
FIG. 14 is a figure showing an example of a difference table 1061.

First, the difference table 1061 will be described. An exemplary configuration of the difference table 1061 is shown in FIG. 14. The difference table 1061 records the information on whether or not difference data exists for each data stored in the PVOL and the storing location if the difference data exist for each of the snapshot pair created in the storage apparatus 100. The storage apparatus 100 refers to the difference table 1061 when carrying out a write/read process regarding the data in the VVOL.

The difference table 1061 records the items of a pair ID 10611, a difference bitmap table 10612, and an LBA table 10613 storing an address where a difference data is saved in mutually correlated manner. The pair ID 10611 is an identification code appended to each snapshot pair created and held in the storage apparatus 100. The difference data bitmap table 10612 and the LBA table 10613 for storing a difference data saving address records the following items respectively regarding the data stored in the PVOL in the snapshot identified by the corresponding pair ID 10611 if the difference data exists: a location of a difference data bitmap correlated with the address of the PVOL where a difference data is saved, and a location of a table indicating an LBA (Logical Block Address) of the difference data in the TP pool 155. Each of the records recorded in the difference table 1061 is created by the snapshot controller 105 when a snapshot pair is created in the storage apparatus 100.

Figure 15:
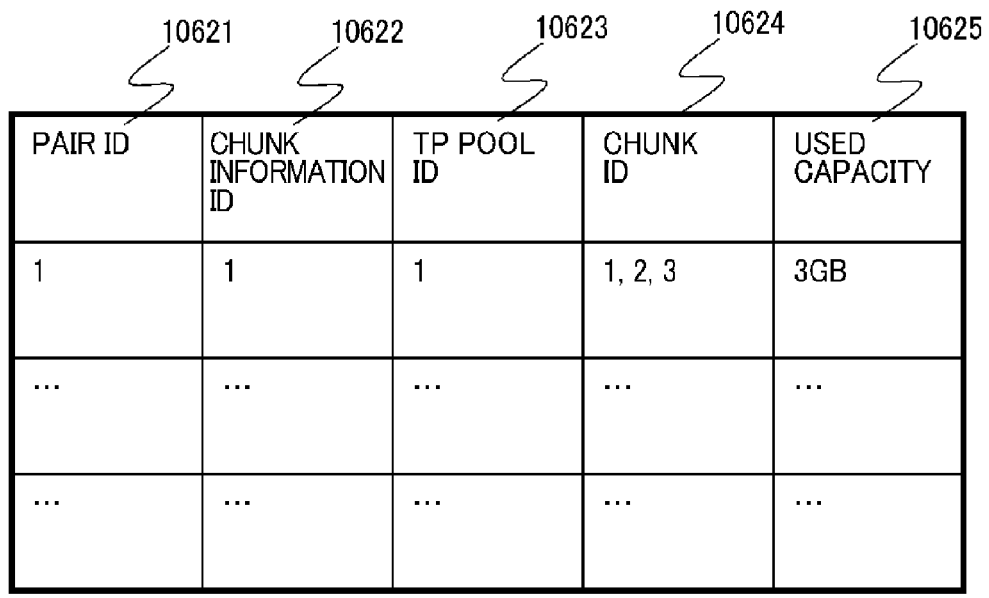
FIG. 15 is a figure showing an example of a pair assignment table 1062.

Next, the pair assignment table 1062 will be described. An exemplary configuration of the pair assignment table 1062 is shown in FIG. 15. The pair assignment table 1062 records for each snapshot pair created in the storage apparatus 100 the information of the unit physical storage area in the TP pool 155 assigned to each snapshot pair. The pair assignment table 1062 is updated when the storage apparatus 100 carries out a write process regarding the data of the VVOL.

The pair assignment table 1062 records a pair ID 10621, a chunk information ID 10622, a TP pool ID 10623, a chunk ID 10624, and a used capacity 10625 in mutually correlated manner. The pair ID 10621 is an identification code appended to each snapshot pair created and held in the storage apparatus 100. The chunk information ID 10622 is an identification code appended to the information on the unit physical storage area assigned from the TP pool 155 to the snapshot pair identified by the corresponding pair ID 10621. The "chunk" is a name given to each unit physical storage area held in the TP pool 155. For example, a single chunk is defined as a physical storage area of 1 GB in size. The TP pool ID 10623 is an identification code of the TP pool 155 to which belongs the chunk assigned to the snapshot pair identified by the corresponding pair ID 10621. The chunk ID 10624 and the used capacity 10625 record an identification code of the chunk assigned to the snapshot pair identified by the corresponding pair ID 10621 and a storage capacity used for the corresponding chunk, respectively. Each record recorded in the pair assignment table 1062 is created by the snapshot controller 105 when the snapshot is created in the storage apparatus 100.

Next, the thin provisioning management table 1063 will be described. An exemplary configuration of the thin provisioning management table 1063 is shown in FIG. 16. The thin provisioning management table 1063 records the information on the TP pool 155 created by the storage apparatus 100. The thin provisioning management table 1063 is updated when the storage apparatus 100 adds or deletes the data of the PVOL or the VVOL of the snapshot pair.

The thin provisioning management table 1063 records the items of a TP pool ID 10631, a used HDD 10632, an assigned area management ID 10633, an unassigned area management ID 10634, and a pool-over threshold 10635 in mutually correlated manner. The TP pool ID 10631 is an identification code assigned to the TP pools 155 created and held in the storage apparatus 100. The used HDD 10632 identifies a storage device such as an HDD providing a physical storage area to the TP pool 155 identified by the corresponding TP pool ID 10631. The assigned area management ID 10633 is an identification code appended to the information indicating the storing address of the chunk to which data is already assigned in the corresponding TP pool 155. The unassigned area management ID 10634 is an identification code appended to the information indicating the storing address of the chunk to which data is not yet assigned in the corresponding TP pool 155. The pool-over threshold 10635 records a threshold level for determining generating a warning on the used capacity of the TP pool 155 identified by the corresponding TP pool ID 10631. When the thin provisioning controller 104 determines that the used capacity has exceeded the pool-over threshold, the thin provisioning controller 104 can be configured to transmit a warning notice to the host 200 or the management computer 300 or to delete any LU to which data is not yet assigned. Each record recorded in the thin provisioning management table 1063 is created when the TP pool 155 is created in the storage apparatus 100.

Next, the snapshot job management table 1064 will be described. An exemplary configuration of the snapshot job management table 1064 is shown in FIG. 17. The snapshot job management table 1064 records the content of a request for a processing received from the host 200 for each snapshot pair held in the storage apparatus 100. The snapshot job management table 1064 is updated when the storage apparatus 100 carries out the process as requested received for the data of the PVOL or the VVOL.

The snapshot job management table 1064 records the items of a pair ID 10641, a PVOL ID 10642, a write data LBA 10643, a write data length 10644, a temporary cache area 10645, a save area LBA 10646, and a job status 10647 in mutually correlated manner. The pair ID 10641 is an identification code appended to each snapshot pair created and held in the storage apparatus 100. The PVOL ID 10642 is an identification code appended to the PVOL of the snapshot pair identified by the corresponding pair ID 10641. The write data LBA 10643 records the LBA where the data on the data write request received from the host 200 is stored. The write data length 10644 records a data length of the data to be written according to the data write request. The temporary cache area 10645 records the storage area in the cache memory 120 for temporarily storing the data to be written when processing the data write request. The save area LBA 10646 records the LBA where the data to be saved from the PVOL are stored when processing the data write request. The job status 10647 records the status of processing of the data write request. Each of the records recorded in the snapshot job management table 1064 is created when the storage controller 103 of the storage apparatus 100 has received a data write request from the host 200 and is updated in accordance with progress of processing of the data write request.

Next, the segment management tables 1065A and 1065B will be described. Exemplary configurations of the segment management tables 1065A and 1065B are shown in FIGS. 18A and 18B respectively. The segment management tables 1065A and 1065B record control information for the temporary cache area set in the cache memory 120 of the storage apparatus 100. The segment management tables 1065A and 1065B are updated in accordance with progress of processing of the data write request from the host 200 by the storage controller 103. It is to be noted that the segment management tables 1065A and 1065B request control information for a write side (W side) and a read side (R side) of the temporary cache area respectively. Into the W side are written data to be written from the host 200 or saved data from a PVOL. The data written into the W side are subject to necessary processings such as generation of parity for storage into the storage device 150 and moved to the R side. The data written into the R side are stored into the storage device 150 by the storage controller 103.

The segment management tables 1065A, 1065B record the items of segment position IDs 10651A, 10651B, destaging disable bits 10652A, 10652B, and reading bits 10653A, 10653B, respectively in mutually correlated manner. The segment position IDs 10651A, 10651B record an identification code of a segment position which is information indicating a storage location in the temporary cache area where write data or saved data is stored. The destaging disable bits 10652A, 10652B record a destaging disable bit which is information indicating whether or not overwriting of write data onto the data stored at the corresponding segment positions 10651A, 10651B is permitted. If the overwriting is not permitted, "ON" is recorded in the destaging disable bits 10652A, 10652B. The reading bits 10653A, 10653B record a reading bit which is information indicating whether or not reading of the data stored at the corresponding segment positions 10651A, 10651B is ongoing. If the reading is ongoing, "ON" is recorded in the reading bits 10653A, 10653B.

Next, the snapshot information table 1066 will be described. An exemplary configuration of the snapshot information table 1066 is shown in FIG. 19. The snapshot information table 1066 records information such as presence or absence of setting regarding a snapshot pair, a status, an attribute and the like of the snapshot pair as set for each LU held in the storage apparatus 100. It is to be noted that the LU constitutes either of a PVOL or an SVOL (VVOL) in a snapshot. The snapshot information table 1066 is updated when the status, the attribute or the like of the snapshot pair is changed by the snapshot controller 105 of the storage apparatus 100.

The snapshot information table 1066 records the items of an LU ID 10661, a pair status 10662, a pair attribute 10663, a partner LUN 10664, a VVOL ID 10665, a secondary LU quantity 10666, a restoration VVOL 10667, a PVOL error flag 10668, an available pool ID 10669, a port ID 1066A, and a target ID 1066B in mutually correlated manner. The LU ID 10661 records an LUN as identification number appended to a PVOL or an SVOL (VVOL) as an LU in the storage apparatus 100. The pair status 10662 records as a status of each snapshot pair any of the following types: PAIR NOT DEFINED, RESTORATION, PRIMARY DATA AND SECONDARY DATA IDENTICAL (initial value), SPLIT, FAILURE, and STATUS MIXED. The pair attribute 10663 records the types of PVOL (P) or SVOL (S). The partner LUN 10664 records an LUN (ID) of the PVOL as a partner of the snapshot pair. The VVOL ID 10665 records the VVOL ID appended to the VVOL when the LU is a VVOL. The secondary LU quantity 10666 records a quantity of the SVOLs (VVOLs) in the snapshot pair. The restoration VVOL 10667 records the VVOL ID appended to the VVOL where a restoration process is being carried out for the VVOL. The PVOL error flag 10668 records ON when failure occurs to the PVOL or the SVOL constituting a snapshot pair and a snapshot function cannot be realized. The available pool ID 10669 records an ID identifying the TP pool 155 assigned to the LU. If the TP pool 155 is not specified, the ID of the TP pool 155 to which the LU as the PVOL is assigned is recorded. The port ID 1066A and the target ID 1066B record a port number and a target ID of the data I/F 15 of the host 200 respectively, providing connection information for the host 200, for the LU identified by the corresponding LU ID 10661. Each record recorded in the snapshot information table 1066 is generated when the thin provisioning controller 104 of the storage apparatus 100 creates each LU.

Next, the snapshot pair specific information table 1067 will be described. One exemplary configuration of the snapshot pair specific information table 1067 is shown in FIG. 20. The snapshot pair specific information table 1067 records therein information such as a status, an attribute, and a processing option for each snapshot pair held in the storage apparatus 100. The snapshot pair specific information table 1067 is updated when the status, an attribute, or the like of a snapshot pair is changed by the snapshot controller 105 in the storage apparatus 100.

The snapshot pair specific information table 1067 records therein the items of a pair ID 10671, an SVOL pair status 10672, an LU ID 10673, a partner LUN 10674, a mirror number 10675, a copy rate 10676, a group designation 10677, a group ID 10678, an SVOL write receipt flag 10679, an SVOL read/write (r/w) disable flag 1067A, a snapshot (SS) split time 1067B, a split mode 1067C, a VVOL capacity predetermination mode 1067D, a scheduling information 1067E, an automatic deletion flag 1067F, and a pair name 1067G in mutually correlated manner.

The pair ID 10671 is an identification code appended to each snapshot pair created and held in the storage apparatus 100. The SVOL pair status 10672 records as a status of each snapshot pair any of the following types: PAIR NOT DEFINED, RESTORATION, PRIMARY DATA AND SECONDARY DATA MATCH (The initial value of the SVOL pair status 10672 where the PVOL data and the SVOL (VVOL) data is synchronized.), SPLIT, FAILURE, and STATUS MIXED. The LU ID 10673 is an identification code or an LUN appended to the PVOL in the corresponding snapshot pair. The partner LUN 10674 is an identification code or an LUN appended to the SVOL (VVOL) in the corresponding snapshot pair. The mirror number 10675 records the number (n−1) of the VVOLs subject to mirroring process to synchronize the data in the PVOL and the VVOL where the number of the PVOL to the number of the VVOL is 1 to n in a snapshot pair. The copy rate 10676 is to designate the option for a copy execution rate in a mirroring process such as HIGH, NORMAL, and LOW. The group designation 10677 records information indicating whether or not a consistency group, hereinafter CTG is defined for the corresponding snapshot pair so as to secure consistency in a data write sequence. The group ID 10678 records, where a CTG is defined for the corresponding snapshot pair, an identification code for identifying the CTG. The SVOL write receipt flag 10679 records ON when the data write request for a VVOL is received from the host 200. The SVOL read/write (r/w) disable flag 1067A records ON where access to a specific VVOL is inhibited. The snapshot (SS) split time 1067B records, where the corresponding snapshot pair is split, a date and a time when the split operation was carried out. The split mode 1067C records information on whether or not the corresponding snapshot pair is split. The VVOL capacity predetermination mode 1067D records, where a maximum storage capacity is set for the VVOL of the corresponding snapshot pair, the storage capacity. The scheduling information 1067E records, where a schedule of carrying out resynchronization process for the corresponding snapshot pair is set, the schedule like EVERY ONE HOUR, or EVERYDAY. The automatic deletion flag 1067F records option information on whether or not automatic deletion is carried out for the LU to which no data is assigned when the used capacity of the TP pool 155 assigned to the corresponding snapshot pair exceeds a predetermined threshold. The pair name 1067G records, where a name is given to the corresponding snapshot pair, the name. Each record recorded in the snapshot pair specific information table 1067 is generated when the snapshot controller 105 of the storage apparatus 100 creates each snapshot pair.

Next, the consistency group (CTG) information management table 1068 will be described. An exemplary configuration of the CTG information management table 1068 is shown in FIG. 21. The CTG information management table 1068 records, where a consistency group is defined for each snapshot pair held in the storage apparatus 100, information such as a status, and an attribute of the consistency group. The CTG information management table 1068 is updated when the status, the attribute, or the like of the CTG of the snapshot pair is changed by the snapshot controller 105 of the storage apparatus 100.

The CTG information management table 1068 records therein the items of a consistency group (CTG) information 10681, a use status 10682, a copy type 10683, a group name 10684 in mutually correlated manner. The CTG information 10681 records an identification code appended to the CTG as defined in the storage group. The use status 10682 indicates for which snapshot pair the CTG is defined, and records the information that the CTG is in use if the CTG is defined. The copy type 10683 records either of the types of "shadow image (SI)" and "snapshot (SS)." If a CTG is used for a non-synchronized pair, "SS" is recorded for the copy type 10683. The group name 10684 records a name given to the corresponding CTG. Each record in the CTG information management table 1068 is created when the snapshot controller 105 of the storage apparatus 100 creates each snapshot pair and defines a CTG for the same.

Next, the LU information management table 1069 will be described. An exemplary configuration of the LU information management table 1069 is shown in FIG. 22. The LU information management table 1069 records therein information such as a status, and an attribute of each LU held in the storage apparatus 100. The LU information management table 1069 is updated when the status, the attribute or the like of each LU is changed by the thin provisioning controller 104 of the storage apparatus 100.

The LU information management table 1069 records therein the items of an LU ID 10691, a related RAID group ID 10692, a data storage area information 10693, a size 10694, a managing controller ID 10695, a host connection information 10696, a pair ID 10697, and a format-in-progress flag 10698 in mutually correlated manner. The LU ID 10691 records an identification code appended to the corresponding LU. The related RAID group ID 10692 records an identification code of the RAID group providing the physical storage area constituting the corresponding LU. The data storage area information 10693 records information such as a ratio of the storage area already assigned to data in the logical storage area for the corresponding LU, for example. The size 10694 records the size of the logical storage area assigned to the corresponding LU. The managing controller ID 10695 records an identification number appended to the controller managing control of the corresponding LU. The host connection information 10696 records information such as a port number of the data I/F 15 to be connected, and an identification code of a virtual machine where the corresponding LU is connected with the host 200. The pair ID 10697 records an identification code appended to the snapshot pair created with the corresponding LU. The format-in-progress flag 10698 records information indicating that formatting is in progress when the storage device 150 such as an HDD constituting a RAID group from which the corresponding LU is created is being formatted. Each record in the LU information management table 1069 is created when each LU is created by the thin provisioning controller 104 of the storage apparatus 100.

Next, the VVOL information management table 106A will be described. One exemplary configuration of the VVOL information management table 106A is shown in FIG. 23. The VVOL information management table 106A records therein the information such as a status, and an attribute of each VVOL held in the storage apparatus 100. The VVOL information management table 106A is updated when the status, the attribute or the like of each VVOL is changed by the snapshot controller 105 of the storage apparatus 100.

The VVOL information management table 106A records therein the items of a VVOL ID 106A1, a size 106A2, a managing controller ID 106A3, a host connection information 106A4, an LU ID 106A5, and a pair ID 106A6 in mutually correlated manner. The VVOL ID 106A1 records an identification code appended to the corresponding VVOL. The size 106A2 records the size of the logical storage area assigned to the corresponding VVOL. The managing controller ID 106A3 records an identification number appended to the controller managing control of the corresponding VVOL. The host connection information 106A4 records information such as a port number of the data I/F 15 to be connected, and an identification code of a virtual machine where the corresponding VVOL is connected with the host 200. The LU ID 106A5 records, where the corresponding VVOL is defined as an LU, an identification code (LUN) appended to the LU. The pair ID 106A6 records an identification code appended to the snapshot pair created with the corresponding VVOL. Each record in the VVOL information management table 106A is created when each VVOL is created by the thin provisioning controller 104 of the storage apparatus 100.

Figure 24:
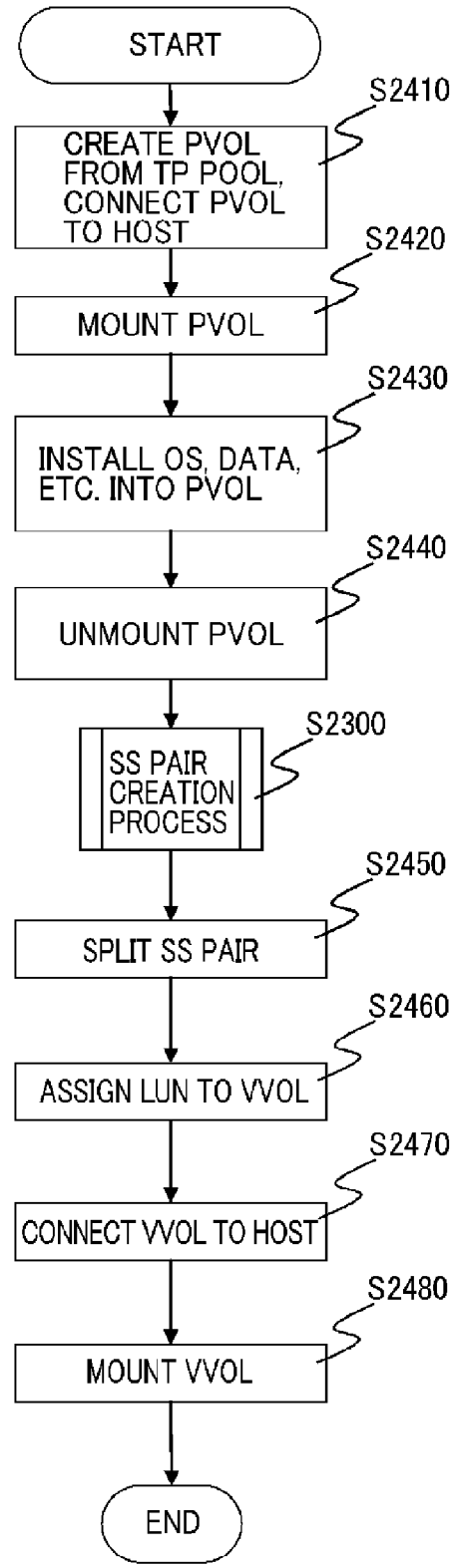
FIG. 24 is a figure describing an example of a process flow of preparation for a snapshot operation.

Next, the snapshot control realized according to the configuration of the storage system 1 of the present embodiment as described above will be described referring to an example of a process flow and the like. First, a process carried out for preparing operation of a snapshot pair in the storage system 1 of the present invention will be described referring to FIG. 24. FIG. 24 shows an example of a process flow of preparation for a snapshot operation.

First, a PVOL which has been created from the TP pool 155 provided by the thin provisioning controller 104 of the storage apparatus 100 is connected with the host as a physical server (S2410). More specifically, a new LU is prepared in the LU information management table 1069 by the thin provisioning controller 104, and "CONNECTED" is recorded in the host connection information 10696.

Then, the snapshot controller 105 has the host 200 recognize the PVOL by recording the port ID 1066A and the target ID 1066B in the snapshot information table 1066 (S2420). Here, a virtual machine has been created in the host 200 by installing and operating virtualization software corresponding to the virtualization controller 240 in the host 200 beforehand.

Pieces of data including the OS required to operate the virtual machine in the host 200 and an application operating on the OS as required are stored in the created PVOL and the PVOL is placed in an unmount status where the PVOL is not recognized by the host 200 (S2430, S2440). Then, the host 200 or the management computer 300 provides a command to the snapshot controller 105 of the storage apparatus 100 and has the snapshot controller 105 carry out a process of creating a snapshot pair (S2300). The snapshot pair creating process will be described later.

At S2450, the snapshot pair created in the snapshot pair creating process at S2300 is split (S2450). An LU is assigned to the VVOL of the snapshot pair and the VVOL is connected with the host 200. The VVOL is subject to recognition by the virtual machine which is to use the VVOL and the snapshot operation preparation process is completed (S2460-S2480). More specifically, The LU assigned to the VVOL is recorded in the LU ID 106A5 and the host connection information 106A4 is changed to "CONNECT" in the VVOL information management table 106A.

According to the configuration as described above, when creating a snapshot pair, there is no need to create the LU storing difference data for constituting the VVOL after estimation of a required storage capacity beforehand and the preparation of a snapshot operation can be facilitated.

Figure 25:
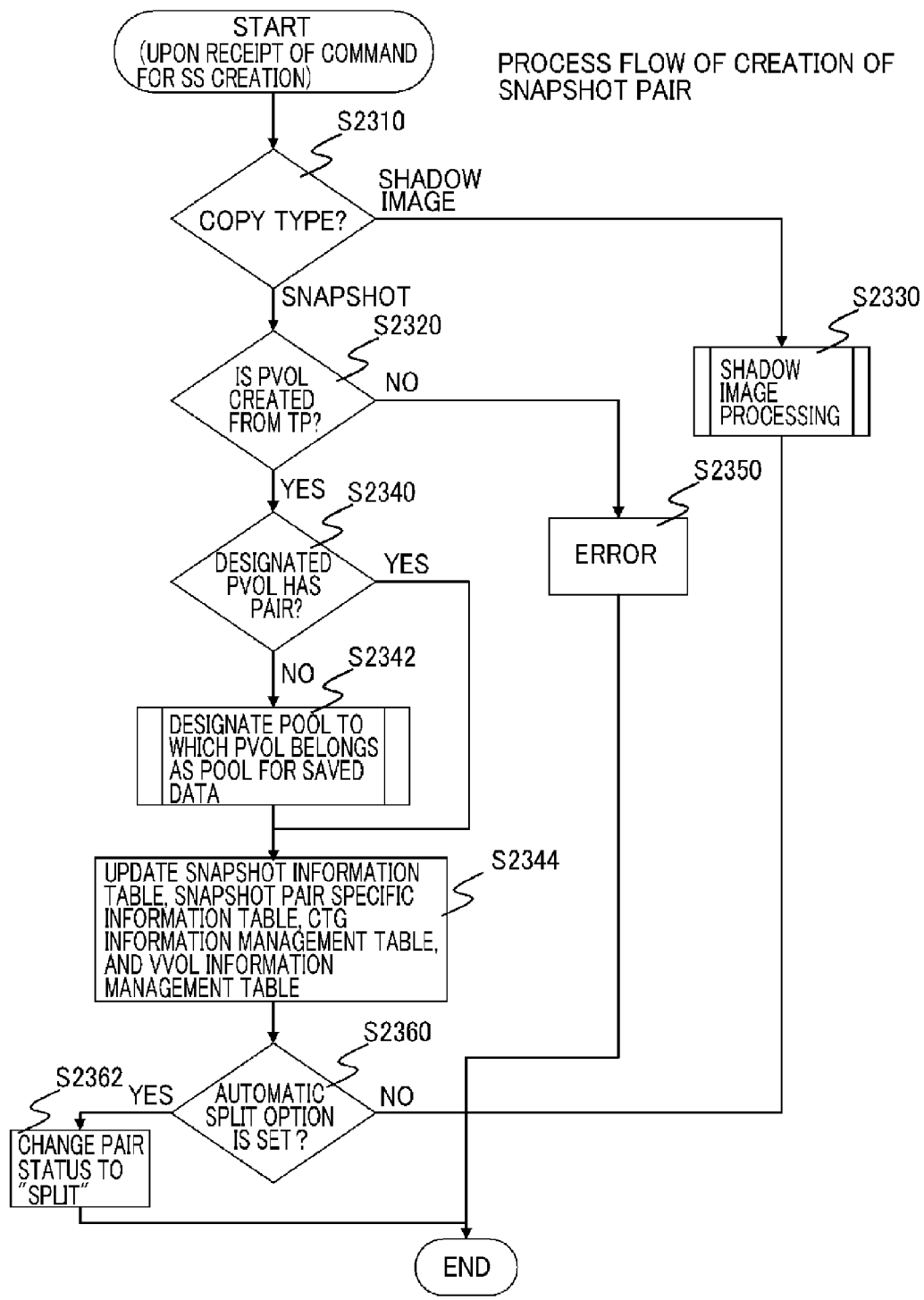
FIG. 25 is a figure showing an example of a process flow of creation of a snapshot pair.

Next, the snapshot pair creating process of the present embodiment (S2300 in FIG. 24) will be described referring to FIG. 25. FIG. 25 shows an example of a process flow of creating a snapshot pair of the present embodiment. The snapshot pair creating process is carried out by the snapshot controller 105 of the storage apparatus 100.

First, the snapshot controller 105 receives a command for creating a snapshot pair from the host 200 and starts the snapshot pair creating process. The snapshot controller 105 refers to the copy type in the snapshot pair creating command as received and determines whether the designated copy type is a shadow image or a snapshot (S2310). If the snapshot controller 105 determines the copy type is a shadow image (S2310, shadow image), the snapshot controller 105 carries out the shadow image process as described in PTL 1 mentioned above and terminates the process (S2330). Since in the shadow image process, such an operation is made that the PVOL and the SVOL of the snapshot pair is synchronized, the shadow image process is not essential to the present embodiment.

If the snapshot controller 105 determines the copy type is a snapshot (S2310, snapshot), the snapshot controller 105 then determines whether or not the PVOL designated in the snapshot pair creating command is created from the TP pool 155 (S2320). If the snapshot controller 105 determines the PVOL is not created from the TP pool 155 (S2320, No), the snapshot controller 105 sends an error information and terminates the process (S2350). The error notification is made because, when the PVOL designated in the snapshot pair creating command is not created from the TP pool 155, the configuration of the PVOL as the condition of the present embodiment is not prepared and the snapshot pair creating process of the present embodiment cannot be carried out.

If the snapshot controller 105 determines the PVOL is created from the TP pool 155 (S2320, Yes), the snapshot controller 105 then determines whether or not a snapshot pair is already created including the PVOL designated in the snapshot pair creating command (S2340). If the snapshot controller 105 determines the snapshot pair is already created (S2340, Yes), the snapshot controller 105 moves the process to S2344. If the snapshot controller 105 determines the snapshot pair is not yet created (S2340, No), the snapshot controller 105 records the TP pool 155 from which the PVOL is created in the used pool ID 10669 in the snapshot information table 1066 as a difference data storing area for the snapshot pair to be created.

Then, the snapshot controller 105 records the information in the snapshot information table 1066, the snapshot pair specific information table 1067, the consistency group (CTG) information management table 1068, and the VVOL information management table 106A according to the information included in the snapshot pair creating command and the predetermined initial value.

Then, the snapshot controller 105 determines whether or not an automatic split option is set in the snapshot pair creating command (S2360). The automatic split option is the information to be included in the snapshot pair creating command when the pair status of the snapshot pair as created is to be automatically changed from "PAIR" (data synchronized state) as the initial state to the split state (PSUS). If the snapshot controller 105 determines the automatic split option is set in the snapshot pair creating command (S2360, Yes), the snapshot controller 105 changes the record in the pair status 10662 in the snapshot information table 1066 to "PSUS" for the snapshot pair currently being processed and terminates the process (S2362). If the snapshot controller 105 determines the automatic split option is not set in the snapshot pair creating command (S2360, No), the snapshot controller 105 terminates the process without taking specific action.

According to the configuration as described above, in the snapshot operation preparation step, an administrator is allowed to create a snapshot pair without cumbersome operation of setting a detailed specification for a snapshot pair.

Figure 26:
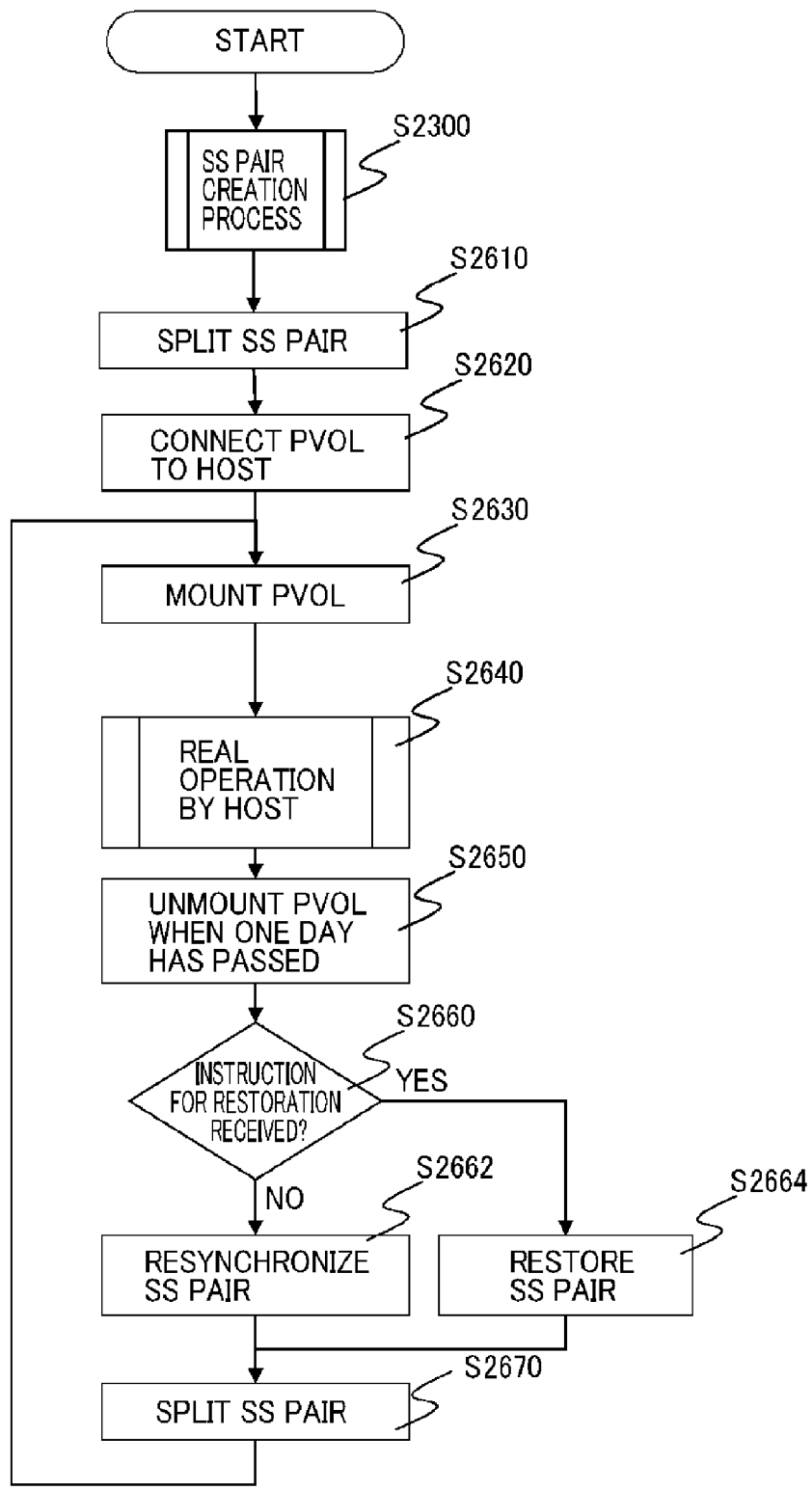
FIG. 26 is a figure showing an example of a process flow of operation of a snapshot.

Next, the process for actual operation of the host 200 using the snapshot pair created according to the above process will be described. FIG. 26 shows an example of the process flow of the actual operation of the snapshot. The example of FIG. 26 assumes that the VVOL of the snapshot pair is assigned to a data storage area for the virtual machine created in the host 200 and the virtual machine is operated while data backup is carried out everyday with the VVOL.

The snapshot controller 105 of the storage apparatus 100 receives a command for starting the operation of the snapshot from the virtual machine of the host 200, creates a snapshot pair by carrying out the snapshot pair creating process S2300 in FIG. 24, and records "PSUS" (Split state) as the pair status of the snapshot pair as created (S2610). Here, if the automatic splitting process is carried out in the snapshot pair creating process in S2300, the process of S2610 can be omitted.

Then, the snapshot controller 105 connects the PVOL of the snapshot pair with the host 200 (the virtual machine) and has the virtual machine recognize the PVOL which uses the snapshot pair (S2620, S2630). According to the above process, the snapshot operation has been readily available, and the host 200 (the virtual machine) is used for the real operation while using the VVOL of the snapshot pair as the data storage area (S2640).

The snapshot controller 105 counts the time elapsed since the start of the operation by the host 200 and unmounts the PVOL after one day to hide the PVOL from the host 200 in the example in FIG. 26 (S2650). The snapshot controller 105 determines whether or not a command for restoration has been received from the host 200 (S2660). If the snapshot controller 105 determines that the restoration command is received (S2660, Yes), the snapshot controller 105 restores the data stored in the VVOL by overwriting the difference data for the VVOL with the data stored in the PVOL (S2664). According to the restoration process, the data stored in the VVOL which are used by the virtual machine can be turned into the state one day before.

If the snapshot controller 105 determines that the restoration command is not received (S2660, No), the snapshot controller 105 reflects the difference data for the VVOL onto the PVOL and resynchronizes the PVOL with the VVOL (S2662). Then, the snapshot controller 105 changes the pair status of the snapshot pair to "PSUS," and moves the process to S2630 (S2670). The above snapshot operation is continuously carried out while the host 200 using the snapshot operates.

According to the above snapshot operation process, the host 200 can be operated with high reliability while obtaining backup data regularly. It is to be noted, while a backup process is carried out everyday using a single VVOL in the example in FIG. 26, two or more VVOLs may be defined in the snapshot pair to hold the backup data for a longer time period or more frequently for the same time period, and the reliability of the operation of the storage system 1 can be improved. When a plurality of VVOLs are defined, the information of the VVOLs as defined is recorded in the snapshot information table 1066, the snapshot pair specific information table 1067, and the VVOL information management table 106A respectively.

Next, the process of writing data into a PVOL in the storage system 1 of the present embodiment will be described. In the present embodiment, each of the virtual machine in the host 200 uses a VVOL of a snapshot pair as a data storage area. Thus, the storage system 1 can be operated more efficiently by improving an access rate of accessing the PVOL creating the snapshot pair with the VVOL.

Figure 27:
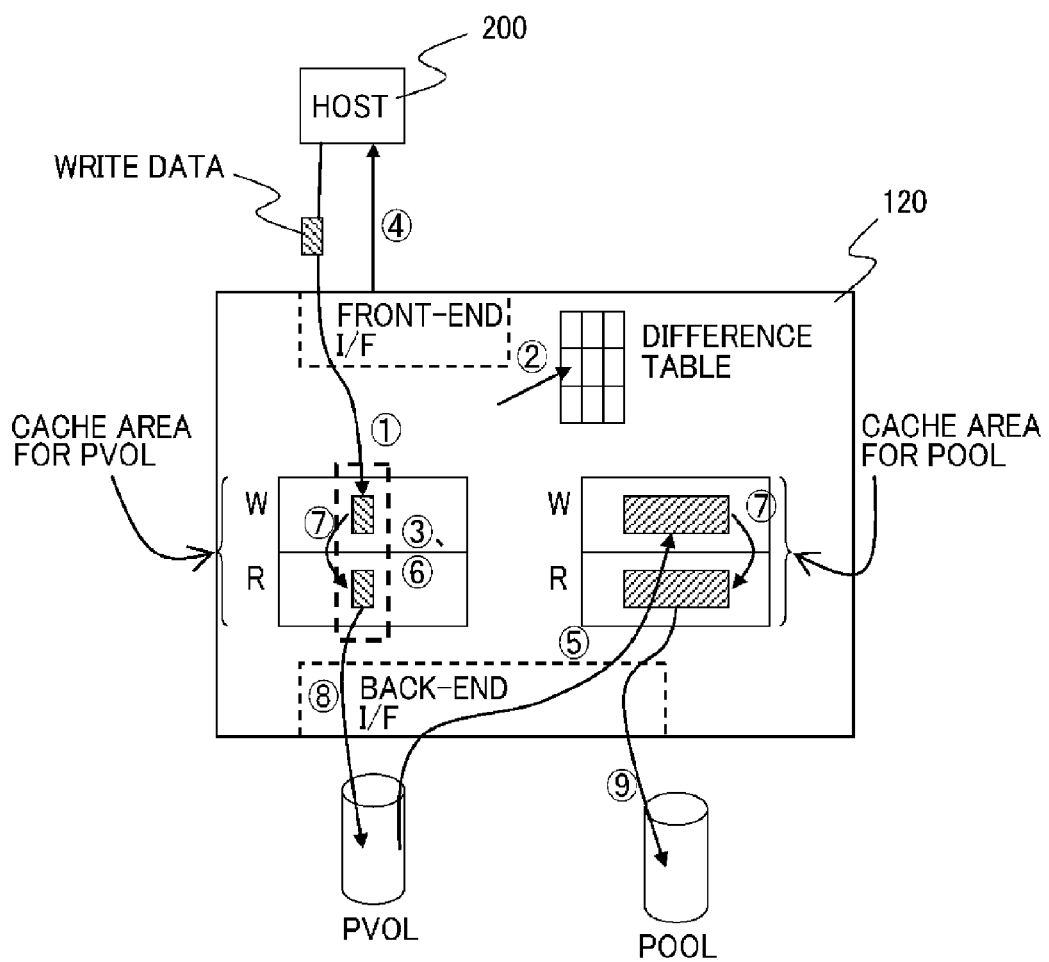
FIG. 27 is a figure describing a process of writing data into a PVOL of a snapshot pair.

FIG. 27 schematically shows the procedure of writing data into the PVOL in the storage apparatus 100 having an existing configuration from the host 200. In the example in FIG. 27, like the example in FIG. 10, the pool as the storage area for the PVOL and the difference data of the PVOL is an ordinary logical volume without utilizing thin provisioning. FIG. 27 schematically shows the cache memory 120 as picked up from the storage apparatus 100 for facilitating understanding. The front-end interface (front-end I/F) and the back-end interface (back-end I/F) respectively represent the communication interfaces constituting the data IO interfaces between the cache memory 120 and the host 200 and between the host 200 and the storage device 150.

The cache memory 120 is provided with a PVOL cache area 120A as a temporary storage area for the data to be written into the PVOL from the host 200 and for the data read from the PVOL and a pool cache area 120B as a temporary storage area for the difference data to be written into the pool and for the data read from the pool. The PVOL cache area 120A and the pool cache area 120B respectively have a write side (W side) as a storage area storing the write data from the host 200 and the data read from the PVOL as they are and a read side (R side) storing the data to be written into the PVOL or the pool, the data being the data stored in the W side with necessary parity data appended thereto.

The data process flow in the cache memory 120 carried out in accordance with the process of writing data into the PVOL from the host 200 will be described according to the order of the encircled number shown in FIG. 27 hereinbelow. The example in FIG. 27 assumes the state where the target data of the data write request from the host 200 do not have the difference data yet. First, the storage controller 103 writes the data included in the data write request into the W side of the PVOL cache area, refers to the difference table 1061, and turns on the difference bit corresponding to the area into which the data is to be written.

Then, the storage controller 103 carries out the process of preventing the data to be written from being automatically written into the PVOL in order to protect the data stored in the area storing the data to be written in the PVOL. This write prevention process will be referred to as "destaging disable process" hereinbelow. Here, the storage controller 103 transmits to the host 200 the notification that the data write process is completed in advance. This process is taken in order to determine that the data write process is completed when the data to be written are written into the cache memory 120 according to a predetermined process and to efficiently operate the storage system 1 by decreasing the time dedicated by the host 200 to the data write process. This process of advance notification of completion of write process will be referred to "Copy-after" hereinbelow.

Next, the storage controller 103 saves the data stored in the area into which the data to be written in the PVOL to the W side of the pool cache area and releases the destaging disable process. Then, the storage controller 103 generates a necessary parity data, appends it to the saved data in the W side of the pool cache area, and stores the saved data into the R side of the pool cache area. When the storage controller 103 finds the data to be stored into the storage device 150 in the PVOL cache area or the pool cache area of the cache memory 120, the storage controller 103 carries out the process for the parity generation above.

Next, the storage controller 103 stores the data in the R side of the PVOL cache area into the PVOL, and stores the data in the R side of the pool cache area into the storage area in the pool as the difference data, and then terminates the process.

Figure 28:
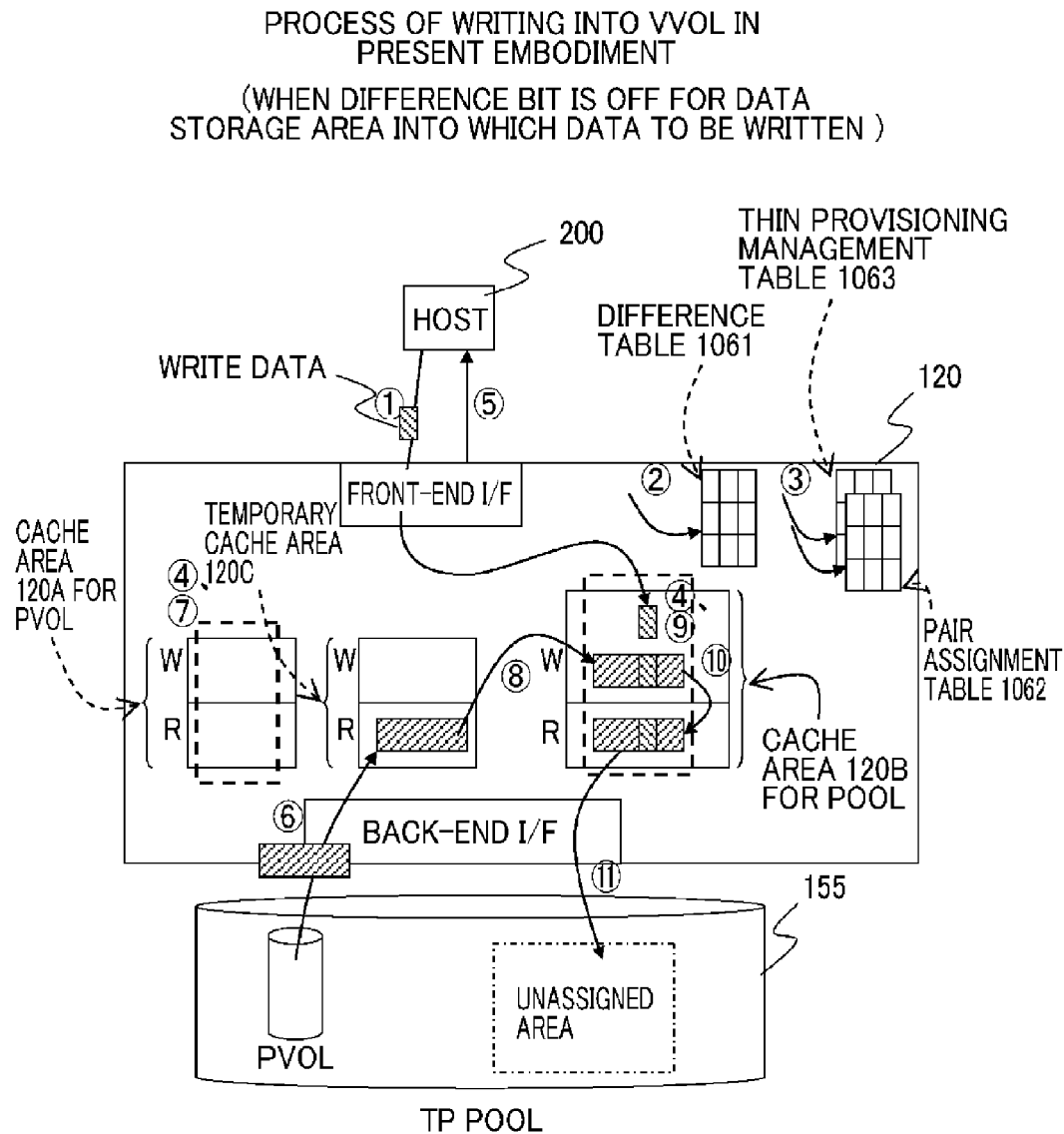
FIG. 28 is a figure describing a process of writing data into a VVOL defined as an SVOL of a snapshot pair.

Next, the data write process in the storage apparatus 100 of the present invention will be described. FIG. 28 schematically shows the data process flow in the storage apparatus 100 when the process of writing data into the VVOL from the host 200 is carried out in the present embodiment. The exemplary configuration in FIG. 28 is different from the configuration in FIG. 27 in that the PVOL and the VVOL substantially constituted from difference data creating a snapshot pair are created from the TP pool 155. Further, in the example of FIG. 28, the configuration regarding the cache memory 120 is basically the same as the configuration in FIG. 27 except that the temporary cache area 120C as the cache area temporarily storing the saved data from the PVOL is provided in the cache memory 120. The temporary cache area 120C is provided with the W side and the R side as the PVOL cache area 120A and the TP pool cache area 120B. The data process flow in the exemplary configuration in FIG. 28 will be described hereinbelow, also referring to the example of the data process flow in FIG. 29.

First, the storage controller 103 receives the data write request for the VVOL from the host 200 (S2810), then, carries out a difference management process S2900, a difference data saving process S3000, and a destaging disable process S3100, and transmits to the host 200 a notification of completion of data write process in advance (S2820). The contents of the difference management process S2900, the difference data saving process S3000, and the destaging disable process S3100 will be more particularly described later referring to FIGS. 30-32.

Then, the storage controller 103 reads the data stored in the area to be written in the PVOL as save data and writes the save data as read into the R side of the temporary cache area 120C (S2830). Here, the data stored in the area to be written in the PVOL are saved, and the storage controller 103 cancels the destaging disable process as the process of preventing writing into the PVOL (S2840).

Next, the storage controller 103 writes into the W side of the TP pool cache area 120B the save data of the PVOL from the R side of the temporary cache area 120C, merges the save data with the data to be written from the host 200 which have been already written to make the data to be written into the area to which data is not yet assigned in the TP pool 155 (S2850). At this stage, the save data from the PVOL are written into the TP pool cache area 120B by extracting a required part of the data saved in the temporary cache area 120C according to the write data LBA 10643 and the write data length 10644 recorded in the snapshot job management table 1064.

Next, the storage controller 103 cancels the destaging disable process for the TP pool cache area 120B (S2860). Then, the storage controller 103 generates a necessary parity data, appends it to the saved data in the W side of the TP pool cache area 120B, and stores the saved data into the R side of the TP pool cache area 120B. When the storage controller 103 finds the data to be stored into the storage device 150 in the TP pool cache area 120B, the storage controller 103 carries out the process for the parity generation above (S2870).

Then, the storage controller 103 stores the data stored in the R side of the TP pool cache area 120B into the storage area of the TP pool 155 as the difference data (S2880).

Here, in the process of writing data into a VVOL, assume that the temporary cache area 120C is not provided as in the existing configuration in FIG. 27. According to this assumption, after transmission of the notification of completion of the data write process for the host 200, the data to be written stored in the W side of the TP pool cache area 120B are overwritten with the save data read from the PVOL as the data stored in the area to be written, and the data write process cannot be continued normally. In the present embodiment, the cache memory 120 is provided with the temporary cache area 120C, and the copy after process is realized which enables advance notification of completion of data write process to the host 200. Thus, improvement in the access rate for accessing from the host 200 is realized.

Figure 29:
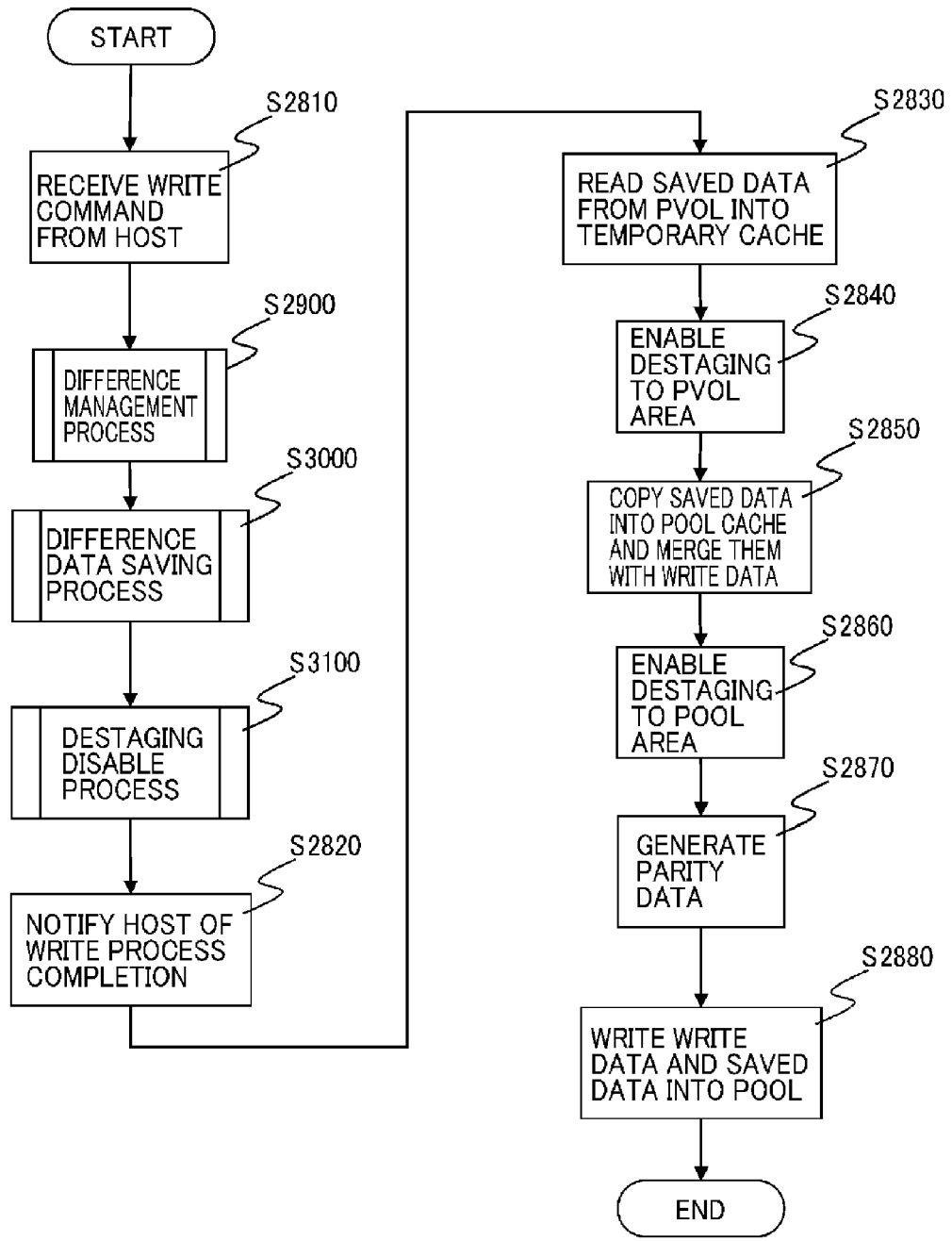
FIG. 29 is a figure showing an example of a process flow of writing data into a VVOL.
Figure 30:
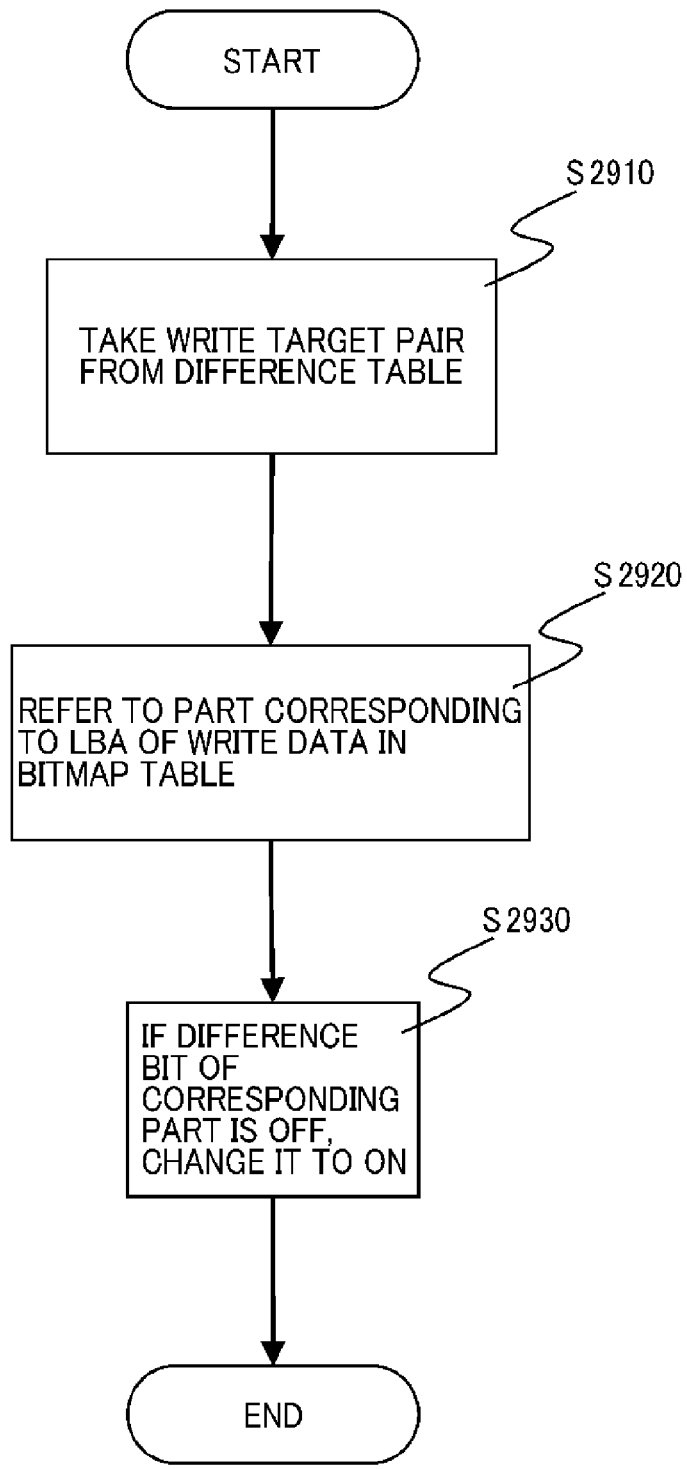
FIG. 30 is a figure showing an example of a difference management process flow in FIG. 29.

Next, the difference management process S2900 in FIG. 29 will be described. An example of the flow of the difference management process S2900 is shown in FIG. 30. In the difference management process S2900, the storage controller 103 refers to the difference table 1061 and manages the state of the difference of the data to be written by the host 200.

First, the storage controller 103 selects the snapshot pair which is the target of the data write process from the difference table 1061 (S2910). Then, the storage controller 103 refers to the corresponding part in the difference bitmap table according to the LBA of the data to be written (S2920), turns on the bit of the corresponding part if the bit is off, and terminates the process. According to the difference management process S2900, the area where difference data is created for the data stored in the PVOL is managed appropriately.

Figure 31:
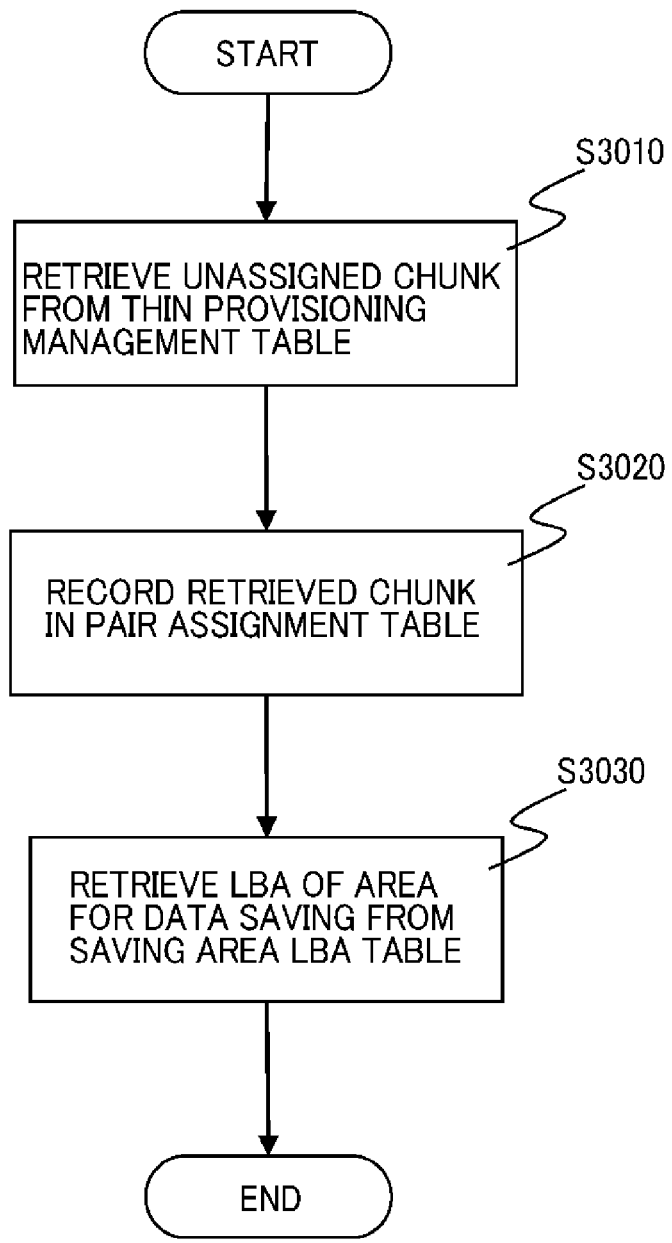
FIG. 31 is a figure showing an example of a difference data saving process flow in FIG. 29.

Next, the process S3000 of the difference data saving will be described. An example of the flow of the difference data saving process S3000 is shown in FIG. 31. In the difference data saving process S3000, the storage controller 103 refers to the difference table 1061 and the thin provisioning management table 1063 and manages the area for saving the difference data.

First, the storage controller 103 refers to the thin provisioning management table 1063 and retrieves the chunk to which data is not yet assigned (S3010). Then, the storage controller 103 records the LBA of the chunk which is defined as the area for save data in the save data LBA table 10613 recorded in the difference table 1061 and terminates the process. According to the above process, the area for saving the difference data in the TP pool 155 for the data write process carried out by the storage controller 103.

Figure 32:
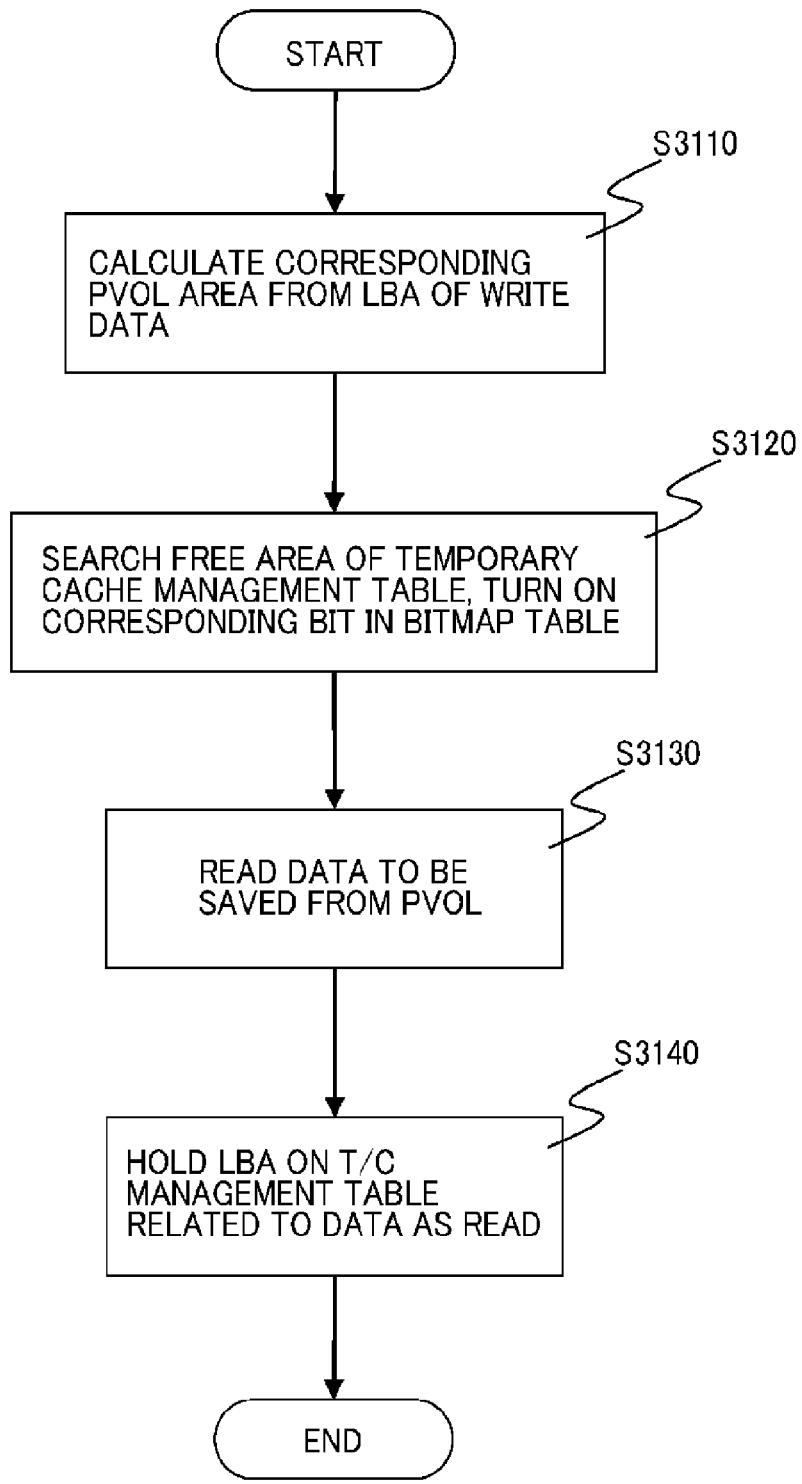
FIG. 32 is a figure showing an example of a process flow of storing saved data into a temporary cache in FIG. 29.

Next, the process S3100 of storing the save data into the temporary cache area 120C in FIG. 32 will be described. An example of the flow of the save data storing process S3100 is shown in FIG. 32. In the save data storing process S3100, the storage controller 103 stores the data read from the target area of writing the data read from the PVOL into the temporary cache area 120C as the save data.

First, the storage controller 103 calculates the LBA for the data to be written as an area of the PVOL using the snapshot job management table 1064 and the pair assignment table 1062 in FIG. 17 (S3110). Then, the storage controller 103 refers to the temporary cache information, searches a free are in the temporary cache area 120C, and turns on the bit corresponding to the storage area to be used in the temporary cache information bitmap (S3120). The temporary cache information is the information managing the unit storage area in the temporary cache area 120C in the bitmap, and for example held in the cache memory 120.

Next, the storage controller 103 reads the save data from the PVOL (S3130), records the LBA in the temporary cache area 120C with respect to the data as read in the snapshot job management table 1064, and terminates the process (S3140). According to the above process, the data stored in the area of a write target of the PVOL are saved.

According to the configuration described above, the data write request from the host 200 for the snapshot pair created from the TP pool 155 can be more efficiently processed. As a result, the efficiency of the availability from the host 200 of the snapshot pair can be improved.

Figure 33:
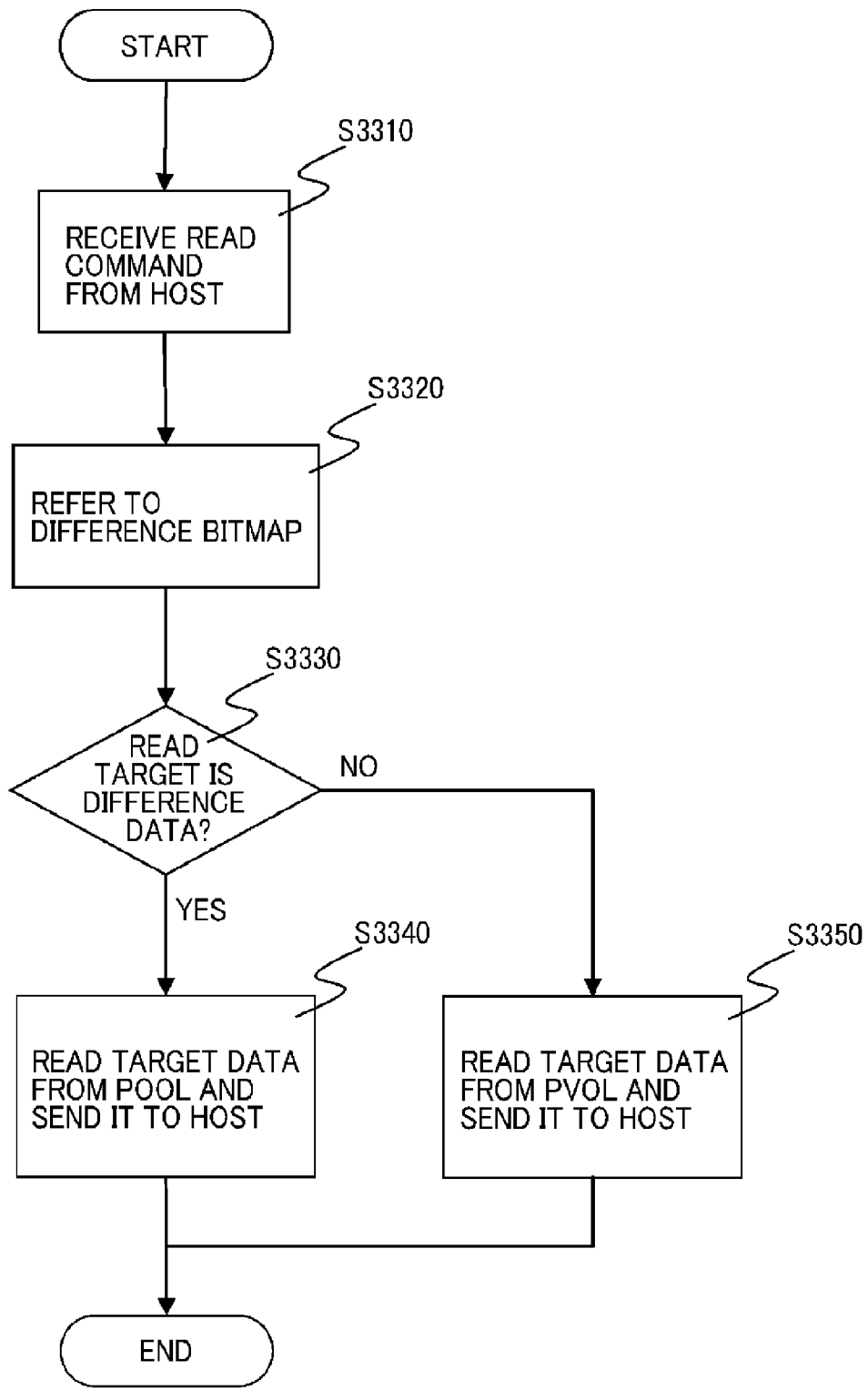
FIG. 33 is a figure showing an example of a process flow of reading data from a VVOL.

Next, a process of reading data from a VVOL in the present embodiment will be described. As described referring to FIG. 12 and the like, the host 200 in the storage system 1 of the present embodiment operates while using a VVOL of a snapshot pair as a data storage area. FIG. 33 shows an example of the flow of the data read process. The data read process is carried out by the storage controller 103.

First, the storage controller 103 receives a data read request from the host 200 (S3310), refers to the difference table 1061 (S3320), and determines whether or not the data to be read are difference data (S3330). If the storage controller 103 determines that the data to be read are difference data (S3330, Yes), the storage controller 103 reads the difference data to be read from the TP pool 155, transmits the data as read to the host 200, and terminates the process (S3340). If the storage controller 103 determines that the data to be read are not difference data (S3330, No), the storage controller 103 reads the data to be read from the PVOL, transmits the data as read to the host 200, and terminates the process (S3350). According to the above process, the data read process of the present embodiment is carried out.

Figure 34:
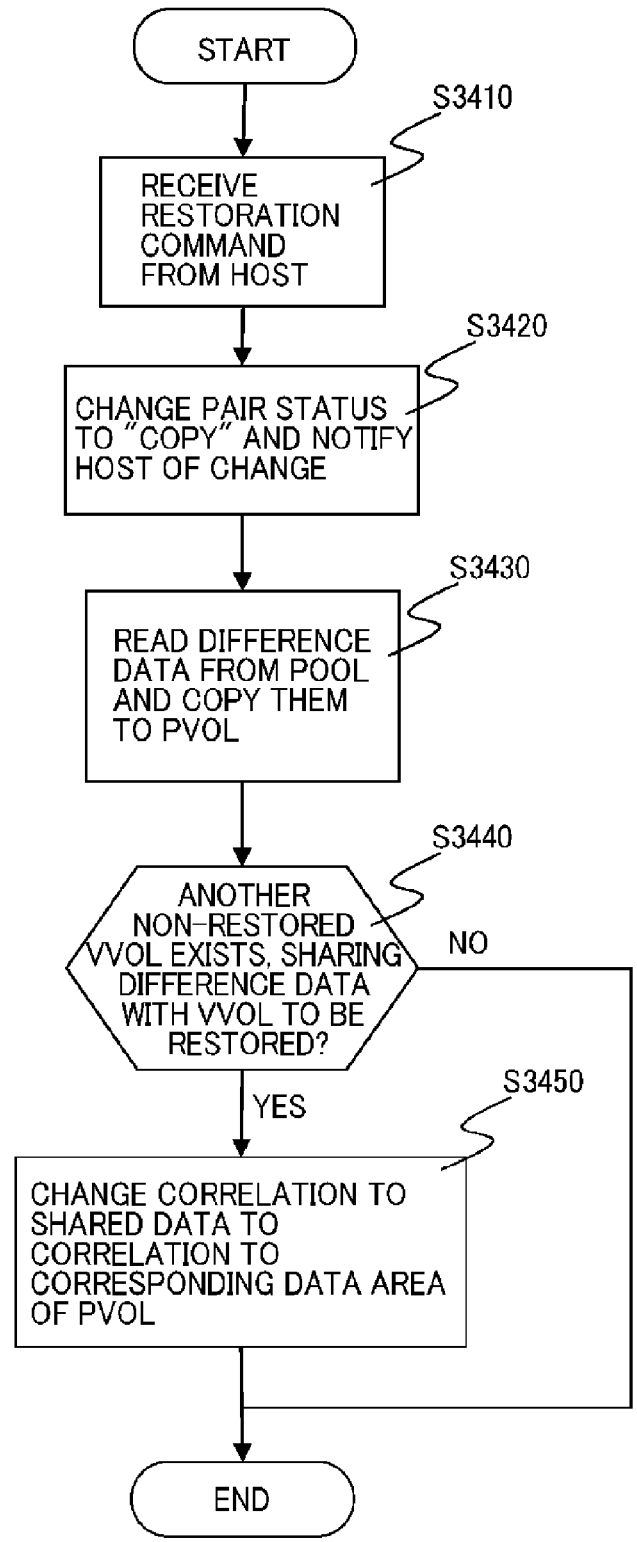
FIG. 34 is a figure showing an example of a process flow of restoring data from a VVOL.

Next, a process of restoring data from a VVOL to a PVOL in the present embodiment will be described. FIG. 34 shows an example of the flow of the data restoration process. The data restoration process is carried out by the snapshot controller 105 in order to restore the PVOL data when a logical failure has occurred to the LU used as the PVOL for example.

First, the snapshot controller 105 receives a data restoration request from the host 200 (S3410), changes the pair status 10662 as usually set "PSUS (Split status)" in the snapshot information table 1066 to "COPY." (S3420) Next, the snapshot controller 105 reads the difference data from the TP pool 155, and stores the difference data as read into the corresponding data storage area of the PVOL (S3430).

The snapshot controller 105 refers to the difference table 1061, and determines whether or not a difference VVOL which is not a target of restoration and shares the difference data copied to the PVOL exists (S3440). If the snapshot controller 105 determines that the different VVOL exists (S3440, Yes), the snapshot controller 105 changes the data storage area to which the difference data is correlated to the corresponding data storage area in the PVOL, and terminates the process (S3450). If the snapshot controller 105 determines that the different VVOL does not exist (S3440, No), the snapshot controller 105 terminates the process without taking an action. According to the above process, the data of the PVOL can be restored using the VVOL as the SVOL when a failure has occurred to the PVOL in the storage system 1 of the present embodiment.

According to the embodiment of the present invention, a storage system with a function of enabling creating a snapshot pair easily while efficiently utilizing storage resources by employing a thin provisioning and a controlling method of the same are provided. Further, according to the embodiment, a storage system enabling improvement of an access rate in accessing an SVOL in a snapshot pair created with the thin provisioning and a controlling method of the same are provided.

While the present invention is described according to one embodiment thereof with referring to the accompanying drawings, it is to be noted that the present invention should not be taken limitative to the embodiment. Any modification, variation of the present invention and the equivalents thereof that do not depart from the spirit of the present invention will be within the scope of the present invention.

The invention claimed is:

1. A storage system comprising:
   a storage device including areas providing a storage area pool;
   a thin provisioning controller allocating a plurality of units of storage areas in the storage area pool to at least one logical volume provided to an external apparatus;
   a snapshot controller configured to:
   designate one of the logical volumes as a primary volume;
   define a secondary volume as a partner pair of data copy including a data backup of the primary volume which is combined data of the data stored in the primary volume and difference data which is data different from the stored data in the primary volume;
   assign unused one of the units of storage areas in the storage area pool, which includes storage areas allocated to the primary volume for storing the difference data; and
   set a volume pair created with the primary volume and the secondary volume either into a synchronizing state where the data stored in the primary volume and the data stored in the secondary volume are synchronized and a non-synchronizing state where the data stored in the primary volume and the data stored in the secondary volume are not synchronized;
   a cache memory for storing data temporarily; and
   wherein the cache memory includes a primary volume data temporarily storing area and a pool data temporary storing area, the primary volume data temporary storing area for storing data read from the primary volume temporarily,
   the pool data temporary storing area for storing data to be written into the storage area pool;
   wherein, when receiving a data write request for the secondary volume from the external apparatus, the storage system is configured to:
   determine whether or not data to be written in the data write request include corresponding difference data;
   if it is determined that data to be written in the data write request do not include corresponding difference data, transmit information indicating that processing of the data write request is completed to the external apparatus after the data to be written are stored into the pool data temporary storing area;
   read primary volume data stored in a storage area including the data to be written from the primary volume;

store the read primary volume data into the primary volume data temporary storing area;

combine the read primary volume data with the data to be written in the pool data temporary storing area; and store the combined data into the storage area pool.

2. The storage system according to claim 1, wherein after the volume pair is created, the primary volume and the secondary volume of the volume pair are automatically set into the non-synchronizing state.

3. The storage system according to claim 1, wherein a plurality of virtual computer are created in the external apparatus using computer virtualization software, and the storage system stores data of software used for operating the virtual computer in the secondary volume so that the secondary volume is used as a data storage area for the virtual computer.

4. The storage system according to claim 1, wherein, if the storage system detects that a ratio of an unused storage area of the storage area pool to an entire storage capacity of the storage area pool exceeds a predetermined value, the storage system deletes a logical volume storing no data in the logical volumes.

5. The storage system according to claim 1, wherein, when the data to be written is stored in the pool data temporary storing area, the storage system inhibits a data write process from the primary volume temporary storing area to the primary volume and a data write process to the pool data temporary storing area.

6. A controlling method of a storage system comprising:

providing a storage area pool from areas included in a storage device;

allocating by a thin provisioning controller a plurality of units of storage areas in the storage area pool to at least one logical volume provided to an external apparatus;

designating by a snapshot controller one of the logical volumes as a primary volume;

defining by a snapshot controller a secondary volume as a partner pair of data copy including a data backup of the primary volume which is combined data of the data stored in the primary volume and difference data which is data different from the stored data in the primary volume;

assigning by a snapshot controller unused one of the units of storage areas in the storage area pool, which includes storage areas allocated to the primary volume for storing the difference data;

setting by a snapshot controller a volume pair created with the primary volume and the secondary volume either into a synchronizing state where the data stored in the primary volume and the data stored in the secondary volume are synchronized and a non-synchronizing state where the data stored in the primary volume and the data stored in the secondary volume are not synchronized;

storing data temporarily in a cache memory;

storing area in the pool data temporarily for storing data to be written into the storage area pool;

wherein the cache memory includes a primary volume data temporary storing area and a pool data temporary storing area, the primary volume data temporary storing area for storing data read from the primary volume temporarily, wherein, when receiving a data write request for the secondary volume from the external apparatus, the storage system is configured to:

determining by the storage system whether or not data to be written in the data write request include corresponding difference data;

if it is determined that data to be written in the data write request do not include corresponding difference data, transmitting information indicating that processing of the data write request is completed to the external apparatus after the data to be written are stored into the pool data temporary storing area;

reading primary volume data stored in a storage area including the data to be written from the primary volume;

storing the read primary volume data as read into the primary volume data temporary storing area; and combining the read primary volume data with the data to be written in the pool data temporary storing area.

7. The controlling method of the storage system according to claim 6, wherein after the volume pair is created, the primary volume and the secondary volume of the volume pair are automatically set into the non-synchronizing state.

8. The controlling method of the storage system according to claim 6, wherein a plurality of virtual computers are created in the external apparatus using computer virtualization software, and the storage system stores data of software used for operating the virtual computer in the secondary volume so that the secondary volume is used as a data storage area for the virtual computer.

9. The controlling method of the storage system according to claim 6, wherein, if the storage system detects that a ratio of an unused storage area of the physical storage area pool to an entire storage capacity of the storage area pool exceeds a predetermined value, the storage system deletes a logical volume storing no data in the logical volumes.

10. The controlling method of the storage system according to claim 6, wherein, when the data to be written is stored in the pool data temporary storing area, the storage system inhibits a data write process from the primary volume temporary storing area to the primary volume and a data write process to the pool data temporary storing area.

* * * * *